(12) United States Patent
Lin

(10) Patent No.: US 9,569,219 B2
(45) Date of Patent: Feb. 14, 2017

(54) LOW-MISS-RATE AND LOW-MISS-PENALTY CACHE SYSTEM AND METHOD

(71) Applicant: Shanghai XinHao Micro Electronics Co. Ltd., Shanghai (CN)

(72) Inventor: Chenghao Kenneth Lin, Shanghai (CN)

(73) Assignee: SHANGHAI XINHAO MICROELECTRONICS CO. LTD., Shanghai (CN)

( * ) Notice: Subject to any disclaimer, the term of this patent is extended or adjusted under 35 U.S.C. 154(b) by 430 days.

(21) Appl. No.: 14/410,059

(22) PCT Filed: Nov. 15, 2012

(86) PCT No.: PCT/CN2012/084645
§ 371 (c)(1),
(2) Date: Dec. 19, 2014

(87) PCT Pub. No.: WO2013/071868
PCT Pub. Date: May 23, 2013

(65) Prior Publication Data
US 2015/0193236 A1    Jul. 9, 2015

(30) Foreign Application Priority Data
Nov. 18, 2011    (CN) .......................... 2011 1 0376514

(51) Int. Cl.
*G06F 9/30*    (2006.01)
*G06F 9/40*    (2006.01)
(Continued)

(52) U.S. Cl.
CPC ......... *G06F 9/3804* (2013.01); *G06F 9/30058* (2013.01); *G06F 9/3808* (2013.01);
(Continued)

(58) Field of Classification Search
None
See application file for complete search history.

(56) References Cited

U.S. PATENT DOCUMENTS 7,975,108 B1    7/2011  Holscher et al.
2002/0087845 A1*   7/2002  Dowling ............. G06F 9/30032
712/228

(Continued)

FOREIGN PATENT DOCUMENTS

CN    1484157 A    3/2004
CN    101187860 A    5/2008

*Primary Examiner* — Hyun Nam
(74) *Attorney, Agent, or Firm* — Anova Law Group, PLLC

(57) ABSTRACT

A method for assisting operations of a processor core coupled to a first memory and a second memory includes: examining instructions being filled from the first memory to the second memory to extract instruction information containing at least branch information of the instructions, and creating a plurality of tracks based on the extracted instruction information. Further, the method includes filling one or more instructions from the first memory to the second memory based on one or more tracks from the plurality of tracks before the processor core starts executing the instructions, such that the processor core fetches the instructions from the second memory for execution. Filling the instructions further includes pre-fetching from the first memory to the second memory instruction segments containing the instructions corresponding to at least two levels of branch target instructions based on the one or more tracks.

19 Claims, 10 Drawing Sheets

(51) Int. Cl.
*G06F 9/38* (2006.01)
*G06F 12/08* (2016.01)

(52) U.S. Cl.
CPC ........ *G06F 9/3861* (2013.01); *G06F 12/0862* (2013.01); *G06F 2212/6028* (2013.01)

(56) References Cited

U.S. PATENT DOCUMENTS

| | | | |
|---|---|---|---|
| 2003/0004683 A1* | 1/2003 | Nemawarkar | G06F 9/3802 702/186 |
| 2006/0149934 A1* | 7/2006 | Eickemever | G06F 9/3804 712/219 |
| 2008/0016330 A1 | 1/2008 | El-Essawy et al. | |
| 2012/0084537 A1* | 4/2012 | Indukuru | G06F 12/0862 712/227 |

* cited by examiner

| | 6005 | 6007 | 6009 | 6011 | |
|---|---|---|---|---|---|
| | A | | | | 6013 |
| | B | | C | | 6015 |
| | D | F | E | G | 6017 |
| | H | J | I | K | 6019 |
| | Q | S | R | T | 6021 |

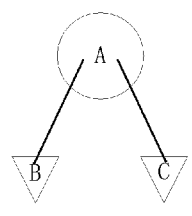
FIG. 6B
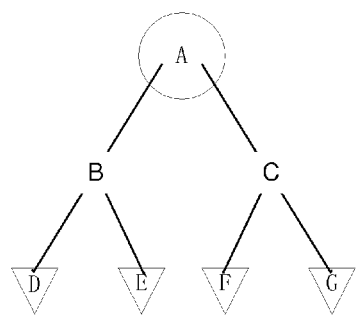
FIG. 6C
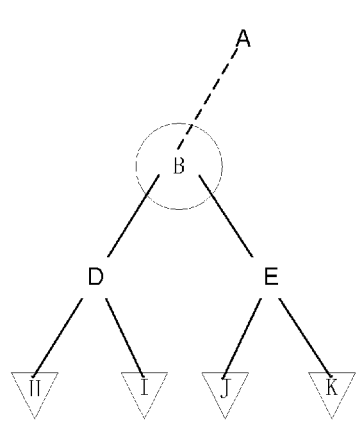
FIG. 6D
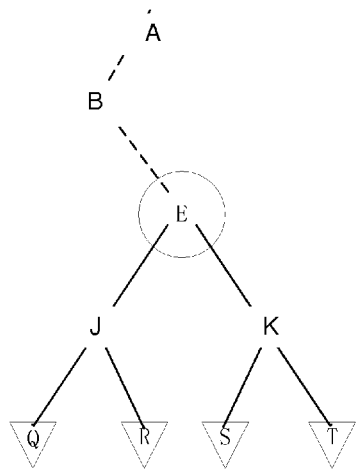
FIG. 6E
| 6005 | 6007 | 6009 | 6011 | |
|---|---|---|---|---|
|  |  | A |  | 6023 |
| B |  | C |  | 6025 |
| F | D | G | E | 6027 |
| H | J | I | K | 6029 |
FIG. 6F

LOW-MISS-RATE AND LOW-MISS-PENALTY CACHE SYSTEM AND METHOD

TECHNICAL FIELD

The present invention generally relates to integrated circuit technologies and, more particularly, to the methods and systems for high-performance cache processing.

BACKGROUND ART

In general, cache is used to duplicate a certain part of main memory, so that the duplicated part in the cache can be accessed by a processor core or central processing unit (CPU) core in a short amount of time and thus to ensure continued pipeline operation of the processor core.

Currently, cache addressing is based on the following ways. First, an index part of an address is used to read out a tag from a tag memory. At the same time, the index and an offset part of the address are used to read out contents from the cache. Further, the tag from the tag memory is compared with a tag part of the address. If the tag from the tag memory is the same as the tag part of the address, called a cache hit, the contents read out from the cache are valid. Otherwise, if the tag from the tag memory is not the same as the tag part of the address, called a cache miss, the contents read out from the cache are invalid. For a multi-way set associative cache, the above operation is performed in parallel on each set to detect which way has a cache hit. Contents read out from the set with the cache hit are valid. If all sets experience cache misses, contents read out from any set are invalid. After a cache miss, cache control logic fills the cache with contents from lower level storage medium.

Cache miss can be divided into three types: compulsory miss, conflict miss, and capacity miss. Under existing cache structures, except a small amount of pre-fetched contents, compulsory miss is inevitable. But, the current pre-fetching operation carries a not-so-small penalty. Further, while multi-way set associative cache may help reduce conflict misses, the number of way set associative cannot exceed a certain number due to power and speed limitations (e.g., the set-associative cache structure requires that contents and tags from all cache sets addressed by the same index are read out and compared at the same time). Further, with the goal for cache memories to match the speed of the processor core, it is difficult to increase cache capacity. Thus, multiple layers of cache are created, with a lower level cache having a larger capacity but a slower speed than a higher level cache.

DISCLOSURE OF INVENTION

Technical Problem

Thus, current modern cache systems normally comprise multiple levels of cache in a multi-way set associative configuration. Although new cache structures such as victim cache, trace cache, and pre-fetching (putting the next cache block into a cache buffer while fetching a cache block or under a pre-fetch instruction) have been developed, due to the widening gap between the speed of the processor and the speed of the memory, cache miss of the existing cache architectures is still a bottleneck in increasing the performance of modern processors.

SOLUTION TO PROBLEM

Technical Solution

The disclosed methods and systems are directed to solve one or more problems set forth above and other problems.

One aspect of the present disclosure includes a method for assisting operations of a processor core. The processor core is coupled to a first memory and a second memory with a faster speed than the first memory. The method includes examining instructions being filled from the first memory to the second memory to extract instruction information containing at least branch information of the instructions. The method also includes creating a plurality of tracks based on the extracted instruction information. Further, the method includes filling one or more instructions from the first memory to the second memory based on one or more tracks from the plurality of tracks before the processor core starts executing the one or more instructions, such that the processor core fetches the one or more instructions from the second memory for execution. To fill the one or more instructions, the method further includes pre-fetching from the first memory to the second memory instruction segments containing the one or more instructions corresponding to at least two levels of branch target instructions based on the one or more tracks.

Another aspect of the present disclosure includes a method for assisting operations of a processor core. The processor core is coupled to a first memory and a second memory with a faster speed than the first memory, and the first memory is coupled to a third memory with a slower speed than the first memory. The method includes examining instructions being filled from the first memory to the second memory to extract instruction information containing at least branch information of the instructions, and creating a plurality of level-one tracks based on the extracted instruction information. The method also includes filling one or more instructions from the first memory to the second memory based on one or more level-one tracks from the plurality of level-one tracks before the processor core starts executing the one or more instructions, such that the processor core fetches the one or more instructions from the second memory for execution. Further, the method includes examining instructions being filled from the third memory to the first memory to extract instruction information containing at least branch information of the instructions, and creating a plurality of level-two tracks based on the extracted instruction information. The method also includes filling the one or more instructions from the third memory to the first memory based on one or more level-two tracks from the plurality of level-two tracks before the processor core starts executing the one or more instructions, such that the first memory fills the one or more instructions into the second memory before the second memory requests the one or more instructions from the first memory.

Another aspect of the present disclosure includes a method for assisting operations of multiple processor cores in a multi-core system. The multi-core system includes a first track table system having a processor core coupled to a first memory and a second memory in the first track table system, a second track table system having a processor core coupled to a first memory and a second memory in the second track table system, and a third memory coupled to both the first memory in the first track table system and the first memory in the second track table. The method includes examining, by each of the first track table system and the second track table system, instructions being filled from the first memory to the second memory to extract instruction information containing at least branch information of the instructions. The method also includes creating, by each of the first track table system and the second track table system, a plurality of level-one tracks based on the extracted instruction information. The method also includes filling, by each of the first track table system and the second track table system, one or more instructions from the first memory to the second memory based on one or more level-one tracks from the plurality of level-one tracks before the processor core starts executing the one or more instructions, such that the processor core fetches the one or more instructions from the second memory for execution. Further, the method includes examining instructions being filled from the third memory to the first memory to extract instruction information containing at least branch information of the instructions, and creating a plurality of level-two tracks based on the extracted instruction information. The method also includes filling the corresponding one or more instructions from the third memory to the first memory based on one or more level-two tracks from the plurality of level-two tracks before the processor core of either the first track table system or the second track table system starts executing the corresponding one or more instructions, such that the first memory of either the first track table system or the second track table system fills the corresponding one or more instructions into the second memory of either the first track table system or the second track table system.

Other aspects of the present disclosure can be understood by those skilled in the art in light of the description, the claims, and the drawings of the present disclosure.

ADVANTAGEOUS EFFECTS OF INVENTION

Advantageous Effects

By using the disclosed methods and systems, advantageous cache applications may be implemented. Different from the current fill-after-miss cache structures, the disclosed methods and systems using track table to pre-fetch branch target instruction segments without referring execution history, an instruction segment can be filled into a higher level memory from lower level memory before the processor core starts to execute instructions in the instruction segment. Thus, with this integrated pre-fetching mechanism, the process of traditional cache tag matching can be avoided.

Further, multiple levels of branch target instruction segments can be pre-fetched, such that the instructions can be fetched well in advance of the execution. The response time for fetching instructions from lower level memory can be eliminated or masked.

In addition, the track table can be compressed in various ways to reduce the size of the track table. The lead pointer can move more quickly and the pre-fetch time of the instruction segments is further reduced. Further, a pruning method may be used to reduce the data and number of write operation to the cache, and instruction cache data pollution may then be avoided.

Moreover, the disclosed track table system can perform instruction search simultaneously with respect to multi-level cache structure, and may also be applied in multi-core systems. Other applications, advantages, alternations, modifications, or equivalents to the disclosed embodiments are obvious to those skilled in the art.

BRIEF DESCRIPTION OF DRAWINGS

Description of Drawings

Figure 1:
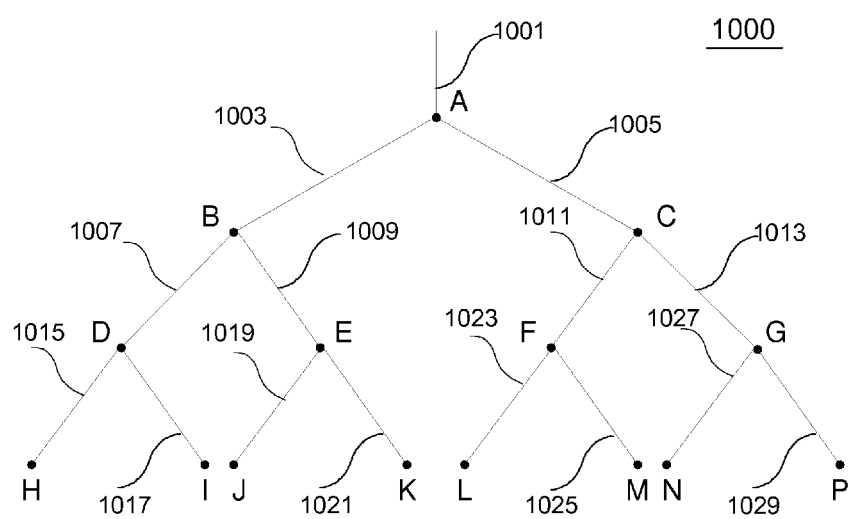
Figure 2:
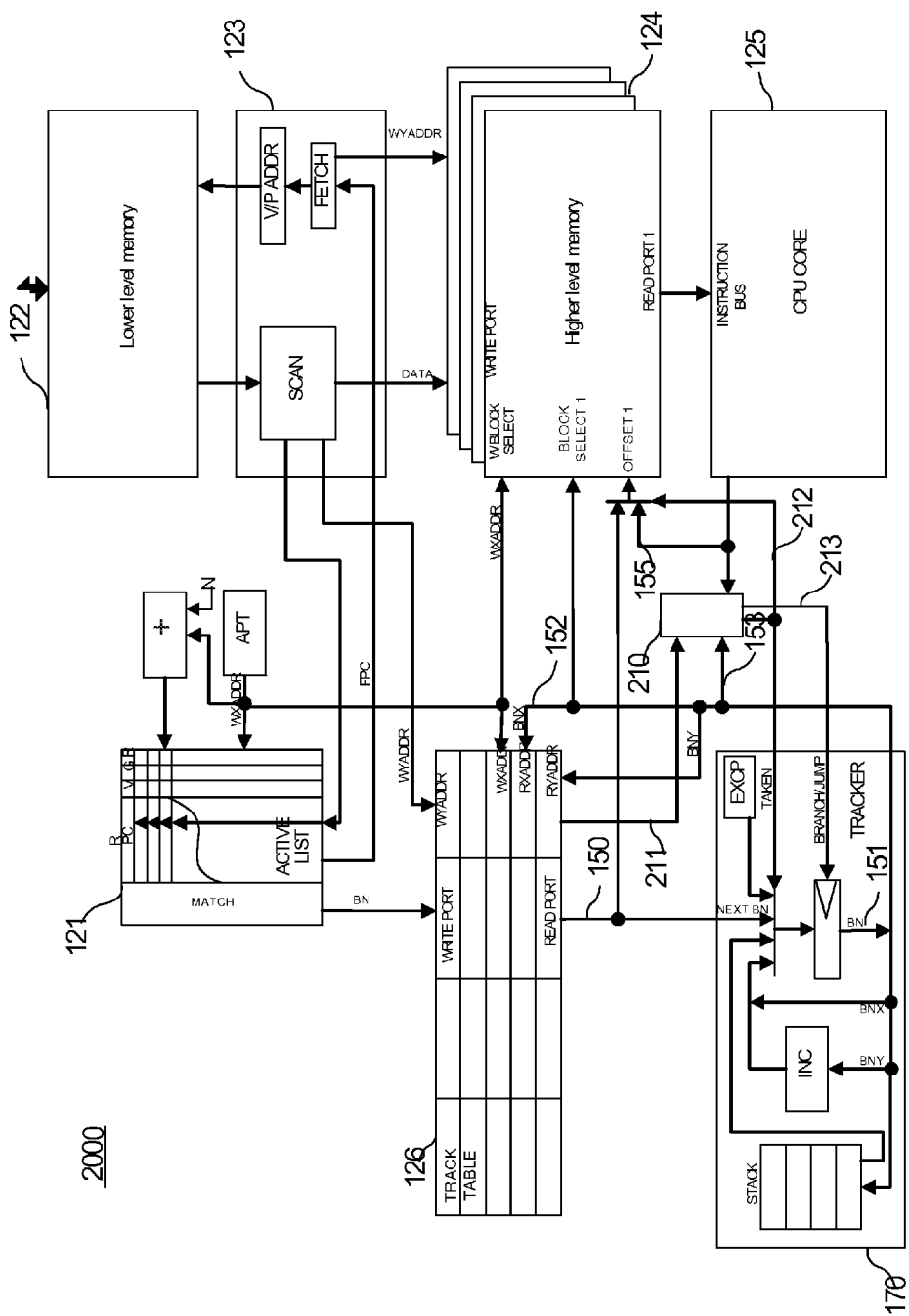
Figures 3, 4:
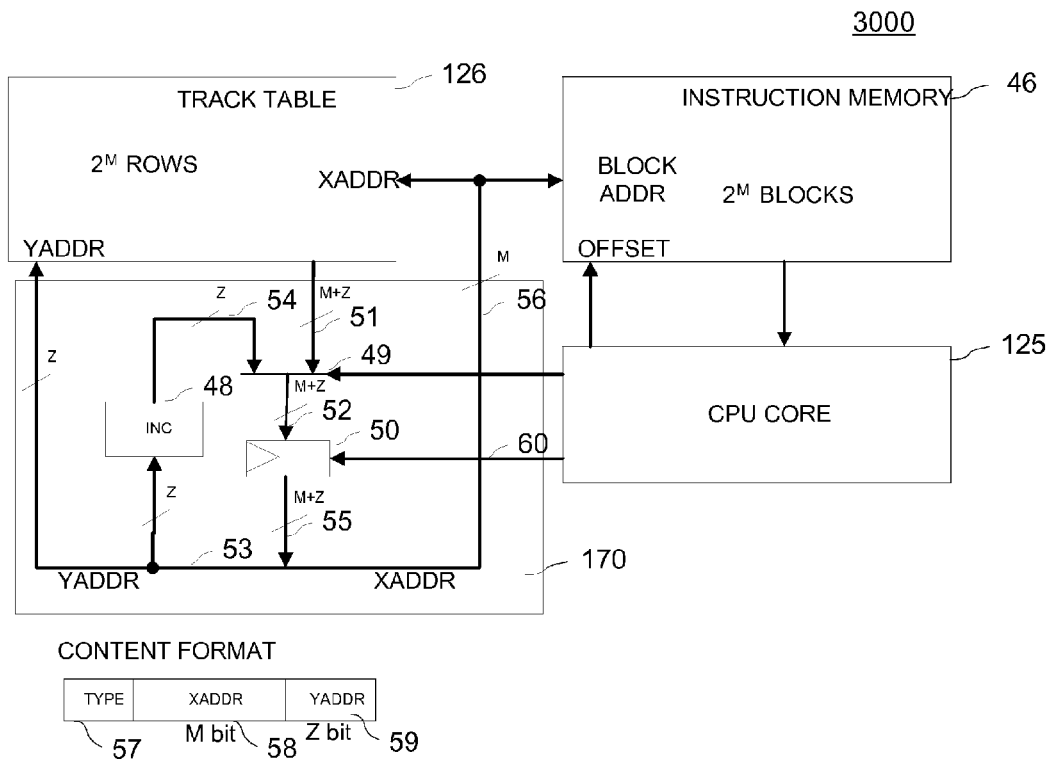
Figures 5, 6A:
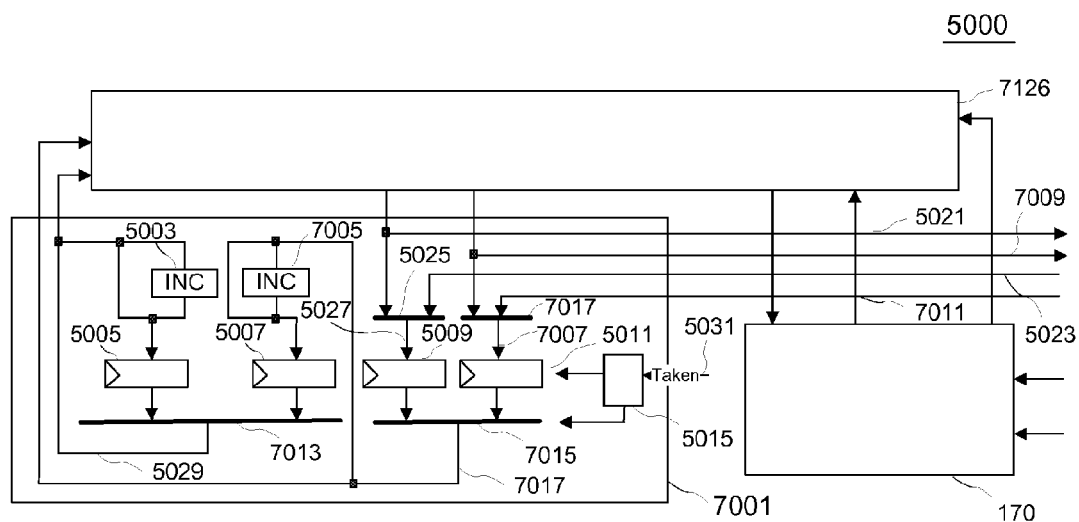
Figure 7A:
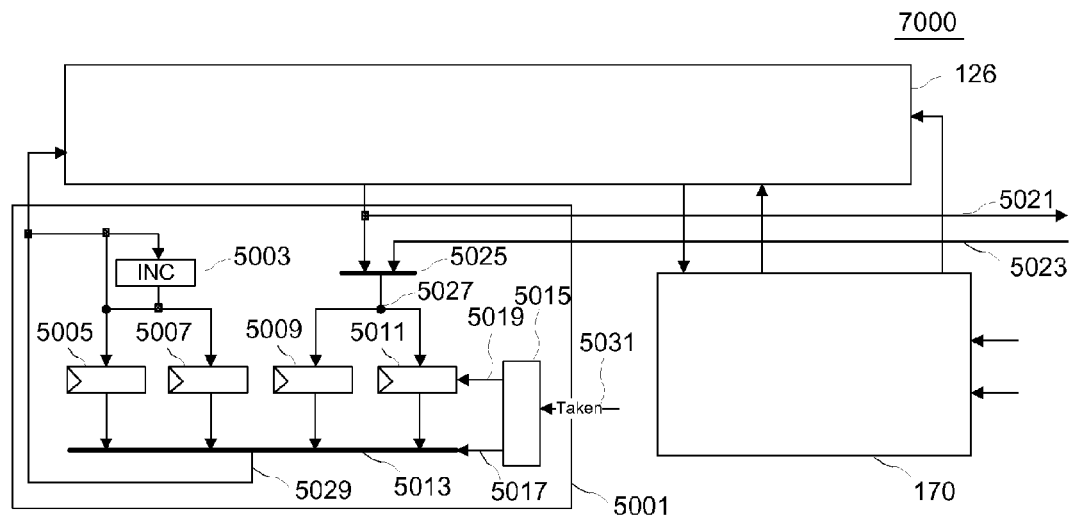
Figure 7B:
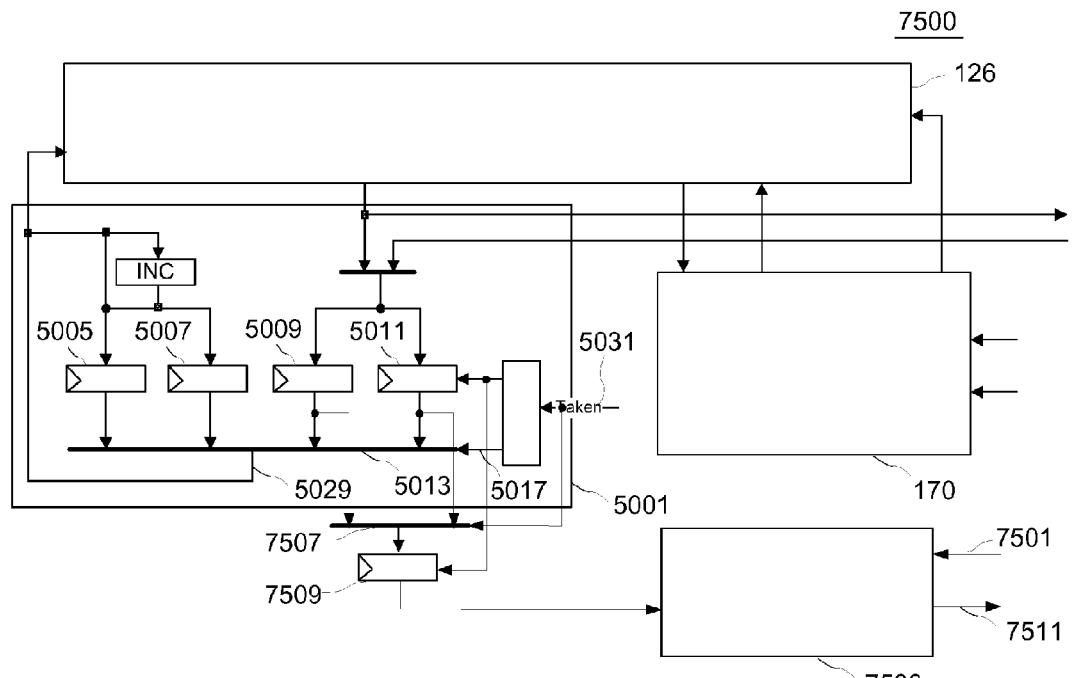
Figure 8:
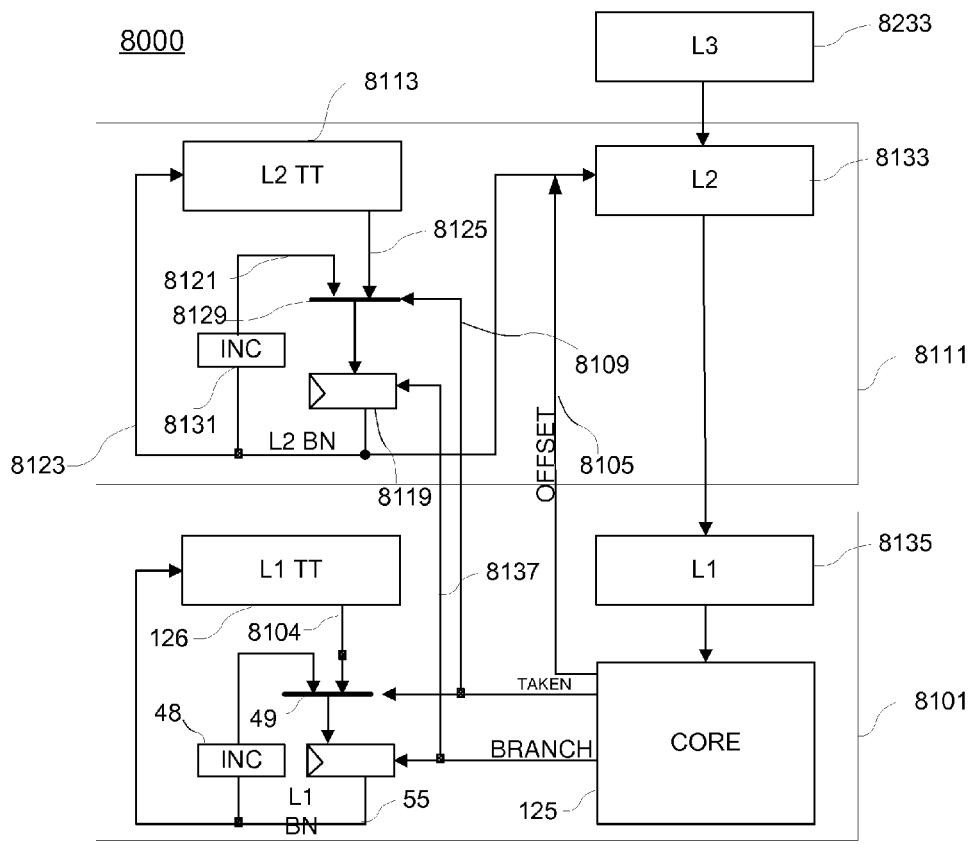
Figure 9:
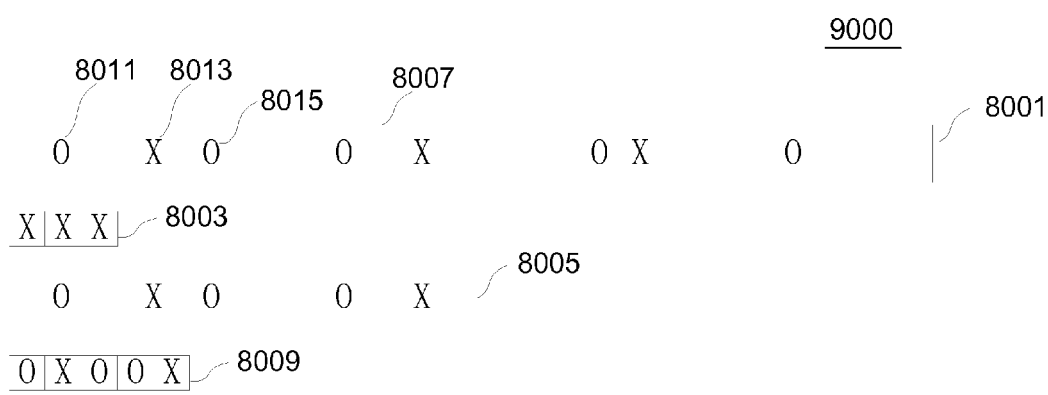
Figure 10A:
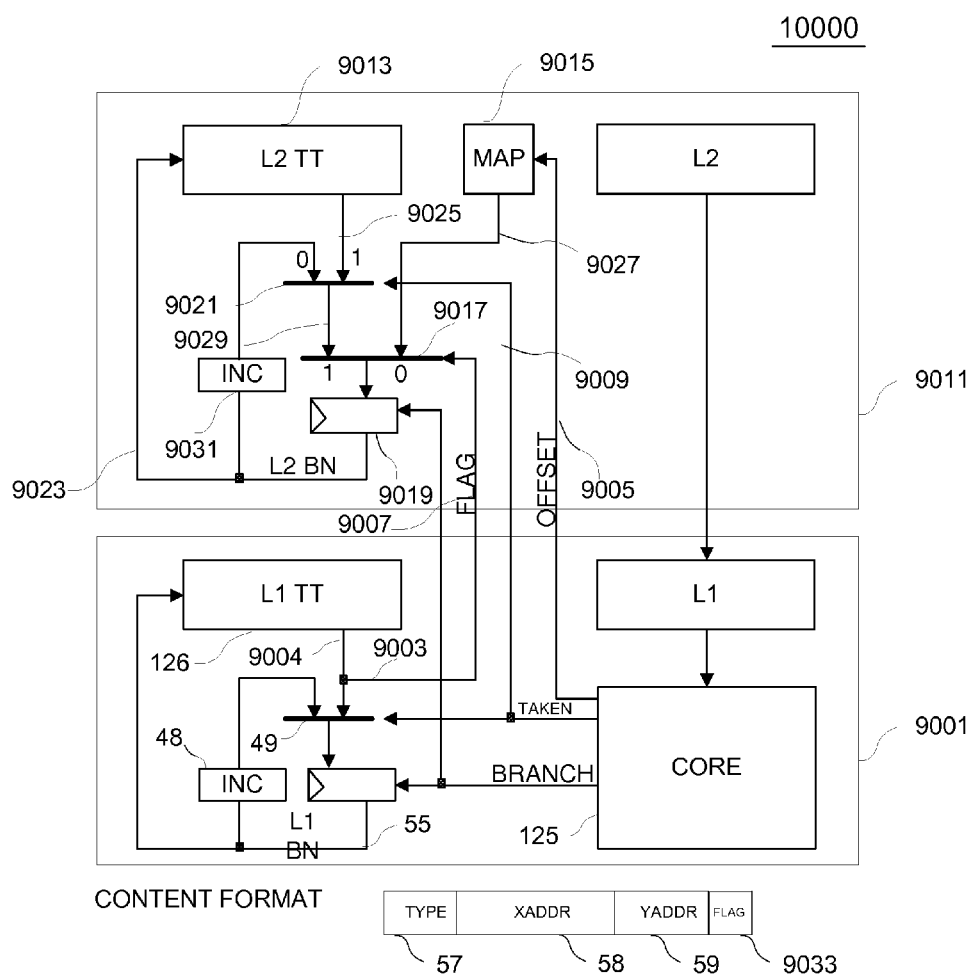
Figure 10B:
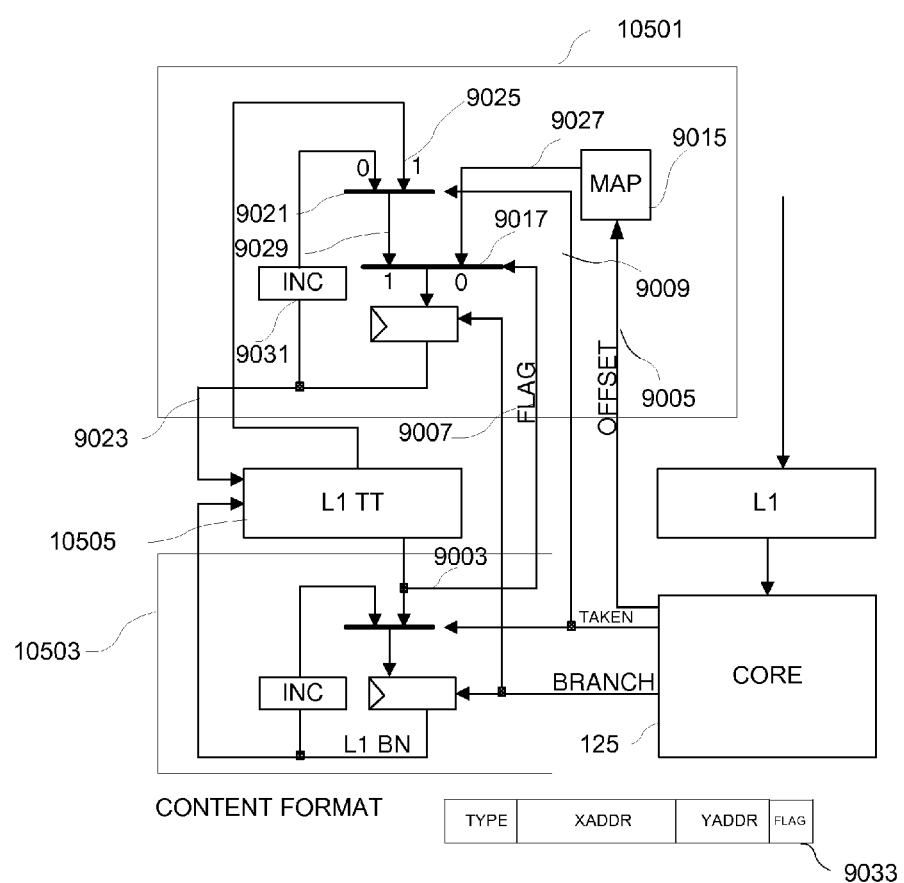
Figure 11:
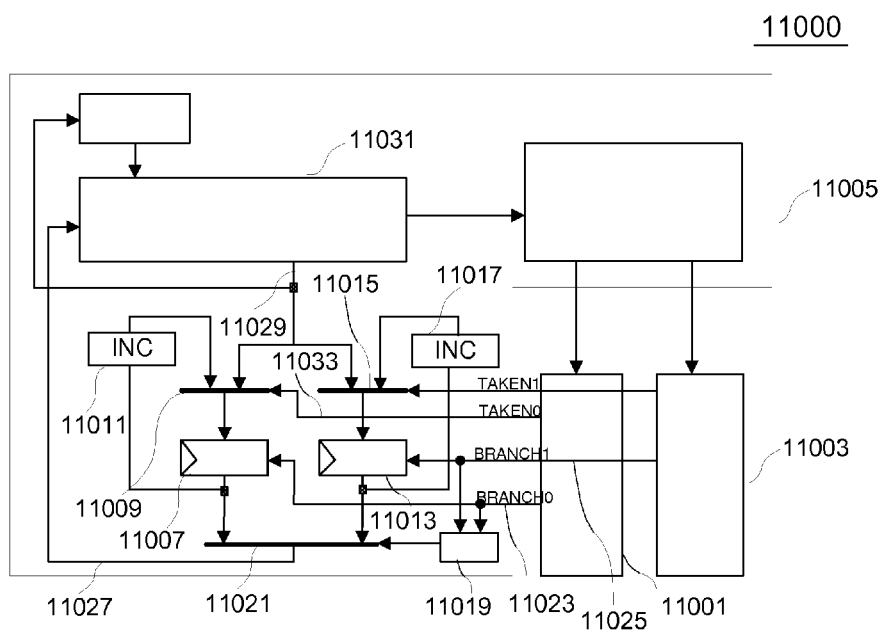
Figure 12:
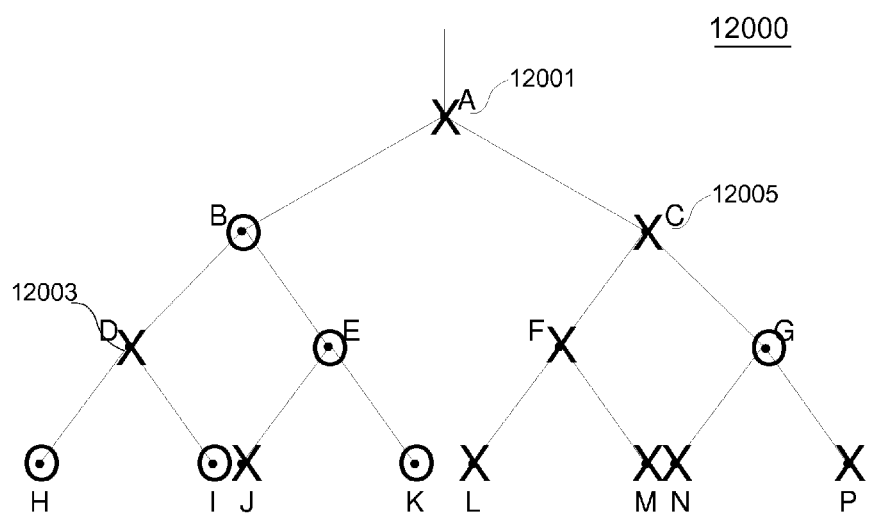

FIG. 1 illustrates an exemplary instruction pre-fetching and execution sequence consistent with the disclosed embodiments;

FIG. 2 illustrates an exemplary computing environment consistent with the disclosed embodiments;

FIG. 3 illustrates an exemplary track table and operations consistent with the disclosed embodiments;

FIG. 4 illustrates an exemplary track table compression structure consistent with the disclosed embodiments;

FIG. 5 illustrates an exemplary two-level pre-fetching logic consistent with the disclosed embodiments;

FIG. 6A illustrates an exemplary track table logic operation consistent with the disclosed embodiments;

FIG. 6B illustrates another exemplary track table logic operation consistent with the disclosed embodiments;

FIG. 6C illustrates another exemplary track table logic operation consistent with the disclosed embodiments;

FIG. 6D illustrates another exemplary track table logic operation consistent with the disclosed embodiments;

FIG. 6E illustrates another exemplary track table logic operation consistent with the disclosed embodiments;

FIG. 6F illustrates another exemplary track table logic operation consistent with the disclosed embodiments;

FIG. 7A illustrates another exemplary two-level pre-fetching logic consistent with the disclosed embodiments;

FIG. 7B illustrates another exemplary two-level pre-fetching logic with prune operation functionality consistent with the disclosed embodiments;

FIG. 8 illustrates an exemplary two-level track table cache structure consistent with the disclosed embodiments;

FIG. 9 illustrates an exemplary compressed track table structure consistent with the disclosed embodiments;

FIG. 10A illustrates an exemplary two-level compressed track table based cache system consistent with the disclosed embodiments;

FIG. 10B illustrates an exemplary level-one cache system consistent with the disclosed embodiments;

FIG. 11 illustrates an exemplary multi-core cache system consistent with the disclosed embodiments; and FIG. 12 illustrates another exemplary level-two track table compression structure consistent with the disclosed embodiments.

BEST MODE FOR CARRYING OUT THE INVENTION

Best Mode

FIG. 5 illustrates an exemplary preferred embodiment(s).

MODE FOR THE INVENTION

Reference will now be made in detail to exemplary embodiments of the invention, which are illustrated in the accompanying drawings.

FIG. 1 illustrates an exemplary instruction pre-fetching and execution sequence 1000. When instructions are executed, a branch instruction may be included, and the branch condition of the branch instruction may be tested to determine whether to execute the next instruction according to the original instruction sequence or to execute the branch target instruction. Thus, the possible paths of execution of the instruction sequence can be represented as a binary tree.

As shown in FIG. 1, instruction sequence 1000 is represented in a binary tree format, with each line segment representing an instruction segment and each black dot representing a branch instruction (i.e., a branch point). Each branch point has two forward paths/lines, the left-side path representing a next instruction (when the branch is not taken) and the right-side path representing a branch target instruction (when the branch is taken). For example, when executing the first instruction segment 1001, branch instruction A is reached. If the branch is not taken, the next instruction is executed from instruction segment 1003; while if the branch is taken, the branch target instruction is executed from instruction segment 1005.

Similarly, when executing instruction segment 1003, branch point B is reached, which has two paths 1007 and 1009, and when executing instruction segment 1005, branch point C is reached, which has two paths 1011 and 1013. Branch points B and C are at the same level.

Further, when executing instruction segment 1007, branch point D is reached, which has two paths 1015 and 1017; when executing instruction segment 1009, branch point E is reached, which has two paths 1019 and 1021; when executing instruction segment 1011, branch point F is reached, which has two paths 1023 and 1025; and when executing instruction segment 1013, branch point G is reached, which has two paths 1027 and 1029. The branch points D, E, F, and G are at the same level. The instruction segments 1015, 1017, 1019, 1021, 1023, 1025, 1027, and 1029 also reach branch points H, I, J, K, L, M, N, and P, respectively, which are at the same level. Thus, a total of three levels of branch points are shown in FIG. 1. Other levels and structures may also be used.

FIG. 2 illustrates an exemplary computing environment 2000 incorporating certain aspects of the present invention. As shown in FIG. 2, computing environment 2000 may includes a CPU or processor core 125, a higher level memory 124, and a lower level memory 122. Computing environment 1000 also includes a fill/generator 123, an active list 121, a track table 126, a tracker 170, and a branch decision logic 210. It is understood that the disclosed components or devices are for illustrative purposes and not limiting, certain components or devices may be omitted and other components or devices may be included. Further, only reading operation may be described in details with the understanding that writing operation is similar to reading operation. The various components may be implemented in a same system or in a distributed system, may be physical components or virtual components, and may be realized by hardware (e.g., integrated circuits), software, or a combination of hardware and software.

Higher level memory 124 and lower level memory 122 may include any appropriate memory devices, such as SRAM, DRAM, and flash memory. As used herein, the level of a memory refers to the closeness of the memory in coupling with a processor core. The closer to the processor core, the higher the level. Further, a memory with a higher level is generally faster in speed while smaller in size than a memory with a lower level. Without limiting, higher level memory 124 may act as a cache for the system or a level-one cache, if other caches exist, and may be separated into a plurality memory segments called blocks (e.g., memory blocks) for storing data segments (i.e., both instructions and data) to be accessed by processor core 125.

CPU or processor core 125 may include any appropriate processor capable of operating in a pipeline mode and with cache systems. The processor core 125 may use separate caches for instructions and data, and may also include certain instructions for cache operations. When processor core 125 is to execute an instruction, processor core 125 first needs to read the instruction and/or data from memory. The active list 121, the track table 126, the tracker 170, and the fill/generator 123 are configured to fill the higher level memory 124 with instructions to be executed by processor core 125, such that processor core 125 can read the instructions from the higher level memory 124 at a substantially low cache miss rate. As used herein, the term 'fill' means to move data/instruction from a lower level memory to a higher level memory, and the term 'memory access' means that processor core 125 reads from or writes to the closest memory (i.e., higher level memory 124 or level-one cache). Such filling may be performed independently from history of execution of instructions by processor core 125 (i.e., without looking at the history of instruction execution).

The fill/generator 123 are configured to fetch the instructions or the instruction segments, using the proper address, from lower level memory 122 and stores the instructions or the instruction segments in higher level memory 124. Further, the fill/generator 123 also scan every instruction fetched/filled into the higher level memory 124 to obtain certain information, such as instruction type, instruction address, and the branch target information of a branch instruction. The branch instruction along with such obtained information are used to calculate an address, and the calculated address and other information are sent to other modules for processing, such as the active list 121 and track table 126. A branch instruction or a branch point, as used herein, refers to any appropriate type of instruction which may cause the processor core 125 to change an execution flow (e.g., executing an instruction out of sequence).

If the instruction segment corresponding to the branch target information has not been filled into the higher level memory 124, the instruction segment is filled into the higher level memory 124 and, at the same time, a corresponding track is also created in the track table 126. The tracks in the track table 126 may have a one-to-one relationship with the memory blocks in the higher level memory 124, and both can be pointed to by a pointer 152. Thus, all instructions to be executed by processor core 125 can be filled into the higher level memory 124 before execution without a cache miss.

Based on the instruction and branch target information, the fill/generator 123 may determine addressing information, such as instruction type, branch source address, and branch target address information. For example, an instruction type may include conditional branch instruction, unconditional branch instruction, and other instructions, etc. The conditional branch instruction may also have sub-types, such as an equal branch instruction and a greater-than branch instruction, etc. Under certain circumstances, unconditional branch may be treated as a special case of conditional branch instruction, with the condition forced to true. A branch source address may refer to the address of the branch instruction itself, and a branch target address may refer to the address being branched to if the branch is taken. Other information may also be included.

Further, the branch target information and other information may be used to build a track table to provide addressing information to be used to fill higher level memory 124. FIG. 3 shows an exemplary track table and operations 3000 consistent with the disclosed embodiments.

As shown in FIG. 3, track table 126 and tracker 170 interact with each other to provide an address to access the higher level memory 124 and to process branch information.

The tack table 126 includes tracks for instructions to be executed by processor core 125, and the tracker 170 provides various addresses based on the track table 126 and also provides a pointer to the track table 126. As used herein, a track refers to a representation of a series of instructions (e.g., an instruction segment) to be executed. The representation may include any appropriate type of data, such as addresses, block numbers, or other numbers. Further, a new track may be created when a track includes a branch point with a branch target which changes program flow or with an instruction from a different instruction segment, such as an instruction from a next instruction segment, an exception program, and a different program thread, etc. The series of instructions may include a same number of instructions or different number of instruction, such as in a variable-length instruction set.

Track table 126 may include a plurality of tracks, and each track in track table 126 corresponds to a row in track table 126 with a row number or a block number (BN), which may index the corresponding memory block. A track may include a plurality of track points, and a track point may correspond to a single instruction or multiple instructions. Further, as a track corresponds to a single row in track table 126, a track point corresponds to a single entry (e.g., a storage unit) from the row in track table 126. The total track points in a track thus may equal to the total number of entries in one row of track table 126. Other configurations may also be used.

A track point (i.e., a single entry in the table entry) may include information about an instruction, such as a branch instruction. Thus, the content of the track point may include information about a type of the corresponding instruction and a target branch address, which may include a track number which addresses a target track, and an offset which addresses an entry within the target track. By checking the contents of a track point, a branch target track point may be determined based on the branch target address.

For example, as shown in FIG. 3, processor core 125 may use a (M+Z) bit instruction address to read instructions for operation, where M and Z are integers. The M-bit part of the address may be referred as an upper address, and the Z-bit part of the address may be referred as an offset address. Track table 126 may then include $2^M$ rows, with a total $2^M$ tracks, and the upper address of M bits may be used as an index to address a track in the track table 126. Each row may include $2^Z$ tracks entries, with a total $2^Z$ track points, and the offset address (Z bits) may be used as an offset to address the corresponding row to determine a particular track point (entry).

Further, each entry or track point in the row may have a content format including a type field 57, an XADDR field 58, and a YADDR field 59. Other fields may also be included. Type field 57 may indicate the type of instruction corresponding to the track point. As previously explained, an instruction type may include conditional branch instruction, unconditional branch instruction, and other instructions. The instruction type may also include a sub-type, e.g., a sub-type for conditional branch instructions, such as equal branch instruction and greater-than branch instruction, etc. XADDR field 58 may include M bit address also called a first-dimension address or simply a first address, e.g., a block address. YADDR field 59 may include Z bit address also called a second-dimension address or simply a second address, e.g., an offset.

When a new track containing a branch point (i.e., a branch track point) is to be created, the new track may be placed at an available row of track table 126, and the branch track point may be created at an entry of the row. The positions of the row and the entry of the branch point in track table 126 are determined by the branch source address (the source address of the branch point). For example, the row may be determined based on the upper address of the branch source address, and the entry may be determined based on the offset of the branch source address.

Further, the content of the new track point may correspond to the branch target instruction. In other words, the content of the branch track point stores the branch target address information. For example, the row number or block number (BN) of a particular row in track table 126 corresponding to the branch target instruction is stored as the first address 58 in the branch track point. Further, the offset address of the branch target, indicating the entry position of the branch instruction within its own track, is stored as the second address 59 in the branch track point. That is, the first address XADDR 58 stored in the branch track point (the branch source) is used as a row address and the second address YADDR 59 stored in the branch track point is used as a column address (i.e., offset) to address the branch target.

Instruction memory 46 may be a part of higher level memory 124 used for instruction access and may include any appropriate high performance memory. Instruction memory 46 may include $2^M$ memory blocks, and each memory block may include $2^Z$ bytes or words of storage. That is, instruction memory 46 may store all instructions addressed by M and Z (i.e., the instruction address) such that M bits can be used to address a particular memory block while Z bits can be used to address a particular byte or word within the particular memory block.

Tracker 170 may include various components or devices, such as registers, selectors, stacks and/or other storages, to determine a next track to be executed by processor core 125. Tracker 170 may determine the next track based on the current track, track point information from track table 126, and/or whether a branch is taken by processor core 125, etc.

For example, during operation, bus 55 carries the instruction address with (M+Z) bits. M bits are put onto bus 56 to track table 126 as the first address or XADDR (or X address), and Z bits are put onto bus 53 to track table 126 as the second address or YADDR (or Y address). Based on the first address and the second address, an entry in track table is identified and its content is outputted to bus 51. The entry may correspond to a branch instruction (a branch track point or branch source), and the entry content outputted through 51 may then provide the target address of the branch.

If the condition of the branch instruction is not satisfied, the branch is not taken, and the not-taken information from the processor core 125 may control selector 49 to select input 54, which is the YADDR on bus 53 increased by one (1) byte or word by incrementer 48, as the new second address, and may output the new address on bus 52. Register 50 keeps the first address unchanged while the second address is kept on being incremented by incrementer 48 by one (1) until a next branch instruction in the current track table row is reached. The first address and the second address are then kept in register 50 and are also provided onto bus 55.

On the other hand, if the condition of the branch instruction is satisfied, the branch is taken, and the taken information from processor core 125 may control the selector 49 to select the new target address stored in the content of the track entry of the branch point and provided on bus 51 as the output on bus 52. Based on the control signal 60 from processor core 125, also called a 'taken' signal indicating that a branch is taken, register 50 keeps the changed first address, and the new address (M+Z) is also provided onto bus 55.

Thus, for instruction memory 46 addressing purposes, a block address 56 is provided by track table 126 and tracker 170 while processor core 125 only supplies an offset. processor core 125 feeds back branch instruction execution status (the 'taken' signal) to enable tracker 170 to make operation decisions.

Before a new track is executed, the instruction segment corresponding to the track is filled into instruction memory 46. This process is repeated such that all instructions can be executed by processor core 125 without a cache miss.

Returning to FIG. 2, to improve operation efficiency and to reduce memory capacity requirement, an active list 121 may be used to store information of an established track, and create a mapping between an address (or a part of the address) and a block number such that tracks can use any available rows in track table 126. For example, when creating a track, address information of the track is stored in the active list. Thus, the active list 121 may store such mapping information for all branch target points in the tracks of track table 126. Other arrangement may also be used.

The active list 121 may be used to store the block addresses of the instruction segments in higher level memory 124, each valid block address corresponding to a block number (BNX). The block number of a particular address may be obtained by a content matching between the address and the entries of active list 121. The matched content encodes a block number, which may then be used to index a row in the track table and a block in higher level memory 124. The block number BNX can also be used with the offset of an instruction in the track (the second address, or BNY) together to determine the position of the track point.

If there is no match, it means that a track corresponding to the address has not been established. The active list 121 may generate a block number and the instruction segment corresponding to the address is filled into higher level memory 124 based on the generated block number. At the same time, a new track is created in track table 126 at a row corresponding to the block number, and the active list 121 can then indicate the mapping between the newly created track and the memory address. Thus, through the operations of the active list 121 and the fill/generator 123, the instruction segment corresponding to the branch target instruction can be filled into the higher memory 124 before the processor core 125 fetches or executes the instruction segment.

Thus, the track table 126 may be configured as a two-dimensional table. The first address BNX can index each row in the 2D table, corresponding to a memory block or a memory row, while the second address BNY can index for each column of the 2D table, corresponding to the offset of related instruction in the memory block. That is, the write address in the track table corresponds to the source address of the related instruction. Further, for a specific branch source address, the active table 121 may assign a BNX according to the high address, and the BNY is then equal to the offset. Then, the BNX and BNY constitute a write address of the entry in the track table.

In addition, when instructions are being filled into the higher level memory 124, the branch target addresses of all branch instructions may be obtained by calculating the address of the branch instruction and the branch offset of the branch target instruction. The branch target address (high address, offset) is sent to the active table 121 for matching the high address. The active table 121 may assign a BNX, and the assigned BNX, together with the instruction type and BNY from the fill/generator 123 constitute the contents of the track table entry of each branch instruction. The contents are stored in the branch point corresponding to the write address.

Tracker 170 may be configured to provide a read pointer 151 to track table 126. Read pointer 151 may also be in the format of BNX and BNY. The content of the track table entry pointed by the read pointer 151 is read out and examined by tracker 170, along with BNX and BNY of the entry point (source BNX and source BNY). Tracker 170 may perform several different steps based on the content. For example, if the entry is not a branch point, tracker 170 may update the read pointer as $BNX_{next}=BNX_{source}$, and $BNY_{next}=BNY_{source}+1$.

If the entry is a conditional branch, tracker 170 may wait for a control signal ('TAKEN') from processor core 125 with respect to the branch point. If the control signal indicates the branch is not taken, tracker 170 may update the read pointer as $BNX_{next}=BNX_{source}$, and $BNY_{next}=BNY_{source}+1$. However, if the branch is taken, tracker 170 may update the read pointer as $BNX_{next}=BNX_{target}$, and $BNY_{next}=BNY_{target}$.

If the entry is an un-conditional branch (or jump), tracker 170 may treat this type of instruction as a taken conditional branch, and thus may update the read pointer as $BNX_{next}=BNX_{target}$, and $BNY_{next}=BNY_{target}$.

The tracker 170, the track table 126, and the active list 121 together may realize the track-based cache-fill operations. Because the addresses for the branch instruction, the branch target instruction, and the next instruction immediately following the branch instruction can be determined in advance of execution, the instructions to be executed by the processor core 125 can be filled into the higher level memory 124 before the processor core 125 fetches or executes the instructions.

In addition, the track table 126 and/or the active list 121 can be compressed in order to save the storage space for each table. FIG. 4 shows an exemplary compression structure 4000 consistent with the disclosed embodiments.

As shown in FIG. 4, track table 126 includes a compressed track table 1262, a correlation table 156, and a flag table 153. The track table 1262 may store the branch target information, but with significantly less number of table entries than the original track table structure. However, the structure of the entry in the track table 1262 may be the same as or similar to that in the original track table structure. Flag table 153 is stored with the table entry number last written into track table 1262. Tables 1262, 156, and 153 may have the same number of rows, and the rows in these tables correspond to each other.

In addition, track table 1262 has a plurality of columns (e.g., 4 columns as shown), whose total number is greater than or equal to the maximum number for branch instructions in any row of the track table 1262. The correlation table 156 may have the same number of columns as the total number of instructions in a track (e.g., 6 columns as shown). Or the correlation table 156 may have one more column than the total number of instructions in a track such that an end column (e.g., 'J' as shown) can be added to the table 156. In this way, each row can jump to the beginning of the next row according to the next instruction from the track. Further, the flag table 153 may only have a single column. The three tables together constitute the improved track table 126.

In operation, to create a new track point in track table 126, the corresponding row address BNX, column address BNY, and the content (e.g., the branch target information) are provided to the track table 126. The BNX is then used to select a row for all tables 1262, 153, and 156. The entry of flag table 153 may then be used to select an entry in the track table 1262 to store the content.

That is, the flag table 153 indicates the column number of an available entry in the row determined by BNX in the track table 1262, and the content is then stored in the available entry in table 1262 at this column. The column number may be referred to as the mapped BNY or MBNY, which is different from the BNY provided for writing. For example, as shown in FIG. 4, the second row of the flag table 153 shows a '2' indicating column 2 of the second row in table 1262 is available for writing the new content, and '2' is the MBNY.

At the same time, the BNY is used to select a column in the same row in the correlation table 156, and the entry at this column and the same row of the correlation table 156 is written with the MBNY, i.e., the column number of the content stored in the track table 1262 (e.g., '2' in the above example). Thus, a mapping relationship is maintained by the correlation table 156 between the BNY and the MBNY. Further, the entry in the flag table 153 is increase by 1 to point to the next available entry in the track table 1262.

In a read operation, the row address BNX and the column address BNY are provided to the track table 126 to read out the content (e.g., the branch target information). The BNX is used to select a row from the table 1262 and 156, and the BNY is used to select a column from the correlation table 156.

The entry in table 156, determined by the BNX and BNY, contains the MBNY of the content in the track table 126. Thus, the BNX and MBNY can be used to access the entry in the track table 1262 to read out the content. In general, branch instructions may be accounted for about ⅙ of the total number of instructions, the number of entries in the track table 1262 can be significantly reduced. Because the entries in the table 156 only need to contain simple content (e.g., a column number or MBNY), the storage for table 156 can be minimized. Thus, the compressed track table structure may reduce the storage needed for the track table operation significantly. Further, because the pointer can move from one branch point to next branch point, the time for pointer operation can also be reduced.

In addition, returning to FIG. 2, during operation, the fill/generator 123, track table 126, tracker 170, and active list 121 may be configured to fill certain levels of instruction segments into the higher level memory 124. The term level may refer to the level of the branch points as shown in FIG. 1, and may also be called a depth of the look-ahead or instruction filling operation.

More particularly, based on the depth of instruction look-ahead, a plurality of tracks can be established at the same time to fill more instruction segments to cover the response time when fetching instructions from the lower level memory.

As used herein, 'a first level branch instruction' refers to the first branch instruction from the instruction currently being executed; 'a first branch point' refers to a branch point corresponding to the 'first level branch instruction'; 'second level branch instructions' refer to the first-reached branch instruction in the instruction segment following the first branch instruction and the first-reached branch instruction following the branch target instruction of the first branch instruction in the instruction; and 'second level branch points' refer to the branch points corresponding to the 'second branch instructions.' Thus, two levels of branch instructions include a total of 3 instructions: the first level branch instruction and two second level branch instructions.

For example, in FIG. 1, the first level branch point is A, and the second level branch points are B and C. For the first level branch point A, instruction segments 1003 and 1005 corresponding to B and C may be pre-filled in the higher memory 124. For the second level branch points B and C, instruction segments 1007, 1009, 1011, and 1013 may be pre-filled in the higher level memory 124. Thus, if the depth of look-ahead is two levels, instructions blocks 1003, 1005, 1007, 1009, 1011, and 1013 are filled in the higher level memory 124. If any of these instruction segments have already been filled in the higher level memory 124, no pre-fetching is needed. Only those instruction segments not already in the higher level memory 124 may need to be pre-fetched into the higher level memory 124. FIG. 5 illustrates an exemplary two-level pre-fetching logic 5000 consistent with the disclosed embodiments.

As shown in FIG. 5, pre-fetching logic 5000 includes a track table 7126, a tracker 170, and a multi-pointer addressing device 7001. In addition, the track table 7126 may be a compressed track table as described in FIG. 4, i.e., any valid entry or track point sequentially read out of the track table 7126 is a branch point. For simplicity purposes, the instruction memory 46 and the processor core 125 are omitted.

The multi-pointer addressing device 7001 may include incrementers 5003 and 7005, pointer registers 5005, 5007, 5009, and 5011, multiplexers 7013 and 7015, and branch decision logic 5015. The pointer registers 5005, 5007, 5009, and 5011 are used to store four branch instructions corresponding to the second level branch points of the current instruction being executed.

The incrementers 5003 and 7005 may be similar to incrementer 48 in FIG. 3. The incrementers 5003 and 7005 may perform the incrementing-by-one operation on one set of the pointer registers from the two sets pointer registers (i.e., 5005 and 5007, 5009 and 5011) to increase the second address (BNY) by one to reach the next branch point in the same track. Further, multiplexers 7013 and 7015 may respectively select one pointer from each pointer register pair 5005 and 5007, and 5009 and 5011 for addressing the track table 7126. The branch decision logic 5015 may process or decode the branch taken signal from the processor core to generate simultaneous write-enable signals for the four pointer registers and select signals for the multiplexers 7013 and 7015.

Further, when the bus 5021 carries the BN of the target track point read out from the track table 7126, the selector 5025 is to select the input from the bus 5021, and the BN is directly stored in the pointer register 5009. If the bus 5021 does not carry BN of the target track point read out from the track table 7126, the active list may be matched, filled, and the corresponding BN may be outputted to the selector 5025 via bus 5023 and to be stored in the pointer register 5009. Similarly, when the bus 7009 carries the BN of the target track point read out from the track table 7126, the selector 7017 is to select the input from the bus 7009, and the BN is directly stored in the pointer register 5011. If the bus 7009 does not carry BN of the target track point read out from the track table 7126, the active list may be matched, filled, and the corresponding BN may be outputted to the selector 7017 via bus 7011 and to be stored in the pointer register 5011. Thus, it may simplified here that the bus 5027 and 7007 always carry BNs of target track points read from the track table 7126 during the lookup/addressing operations. FIG. 6A illustrates an exemplary corresponding logic operation.

As shown in FIG. 6A, with reference to the track tree in FIG. 1, the four columns 6005, 6007, 6009, and 6011 of the table represent the values of the four pointer registers 5005, 5007, 5009, and 5011, respectively, and the rows represent the contents of the four pointer registers after each update.

At the beginning, branch point A is the first branch point after the program is executed. The BN of the branch point A is written into the pointer register 5005. At this point, among the four pointer registers, only the value of the pointer register 5005 is valid, as shown in the row 6013. At this time, the multiplexer 7013 selects the output of the pointer register 5005 as the value of the pointer 5029, and BNY of the pointer 5029 is sent to the incrementer 5003 to be increased by one to move the BNY to the next branch track point following the branch point A (i.e., branch point B). The BN is then updated and stored into the pointer register 5005. At the same time, the value of the pointer 5029 is sent to the track table 7126 for look-up/addressing to read out a target track point of the branch point A (i.e., branch point C), and the BN value is updated and written into the pointer register 5009, as shown in row 6015. Thus, the instruction segments 1003 and 1005 corresponding to branch points B and C can be filled into the higher level memory/cache.

Further, the multiplexer 7013 selects the output of the pointer register 5005 as the value of the pointer 5029, and BNY of the pointer 5029 is sent to the incrementer 5003 to be increased by one to move the BNY to the next branch track point following the branch point B (i.e., branch point D). The BN is then updated and stored into the pointer register 5005. At the same time, the value of the pointer 5029 is sent to the track table 7126 for look-up/addressing to read out a target track point of the branch point B (i.e., branch point E), and the BN value is updated and written into the pointer register 5009, as shown in row 6017. Thus, the instruction segments 1007 and 1009 corresponding to branch points D and E can be filled into the higher level memory/cache.

Meanwhile, the multiplexer 7015 selects the output of the pointer register 5009 as the value of the pointer 7017, and BNY of the pointer 7017 is sent to the incrementer 7005 to be increased by one to move the BNY to the next branch track point following the branch point C (i.e., branch point F). The BN is then updated and stored into the pointer register 5007. At the same time, the value of the pointer 7017 is sent to the track table 7126 for look-up/addressing to read out a target track point of the branch point C (i.e., branch point G), and the BN value is updated and written into the pointer register 5011, as shown in row 6017. Thus, the instruction segments 1011 and 1013 corresponding to branch points F and G can be filled into the higher level memory/cache. The above operations may be performed without the taken control signal from the processor core.

After the above two-step updating, the instructions corresponding to two branch levels from the branch point A are pre-fetched. The multi-pointer addressing device 7001 stops updating and waits for the branch taken information 5031 from the processor core.

The first branch point A is executed by the processor core (i.e., the read pointer 55 in FIG. 3 pointing to the branch point A) and the branch taken information 5031 is sent to the multi-pointer addressing device 7001. If the information 5031 shows branch is taken, the next branch point to be executed is updated to the branch point C (i.e., the read pointer 55 in FIG. 3 pointing to the branch point C), and the four pointer registers are updated to the branch points L, M, N, and P, and corresponding instruction segments are pre-fetched.

On the other hand, if the branch taken information 5031 shows that the branch is not taken, the next branch point to be executed is updated to the branch point B (the read pointer 55 in FIG. 3 pointing to the branch point B) and the four pointer registers are updated to the branch points H, I, J, and K, and corresponding instruction segments are pre-fetched.

More particularly, when the branch of the branch point A is not taken, the branch decision logic 5015 generates a control signal, such that the multiplexer or selector 7013 selects the output of the pointer register 5005 as the value of the pointer 5029, and BNY of the pointer 5029 is sent to the incrementer 5003 to be increased by one to move the BNY to the next branch track point following the branch point D (i.e., branch point H). The BN is then updated and stored into the pointer register 5005. At the same time, the value of the pointer 5029 is sent to the track table 7126 for look-up/addressing to read out a target track point of the branch point D (i.e., branch point I), and the BN value is updated and written into the pointer register 5009, as shown in row 6019. Thus, the instruction segments 1015 and 1017 corresponding to branch points H and I can be filled into the higher level memory/cache.

At the same time, the control signal generated by the branch decision logic 5015 enables the multiplexer or selector 7015 to select the output of the pointer register 7017 as the value of the pointer 5009, and BNY of the pointer 7017 is sent to the incrementer 7005 to be increased by one to move the BNY to the next branch track point following the branch point E (i.e., branch point J). The BN is then updated and stored into the pointer register 5007. At the same time, the value of the pointer 7017 is sent to the track table 7126 for look-up/addressing to read out a target track point of the branch point E (i.e., branch point K), and the BN value is updated and written into the pointer register 5011, as shown in row 6019. Thus, the instruction segments 1019 and 1021 corresponding to branch points J and K can be filled into the higher level memory/cache. Pre-fetching for two levels of the branch points is completed, and the multi-pointer addressing device 7001 again stops updating and waits for the branch taken information 5031 from the processor core.

For the branch point updating operation, a 'root' and a lead pointer may be used to represent the current branch point and the branch point associated with the pointer register. For example, if the branch point A is the first branch point following an instruction currently being executed by the processor core, the branch point A is considered as the root branch point of the current instruction pre-fetching. The branch points B and C are then the second level branch points, and branch points D, E, F, and G correspond to branching points pointed by the four lead pointers of the root branch point A. FIGS. 6B-6E illustrate exemplary interactions of the root and lead pointers, where a circle represents a root branch point and a triangle represents a lead pointer.

As shown in FIG. 6B, the root is branch point A. Based on the root branch point A, the next branch point B and the branch target point C of the branch target of the root branch point can be established in the pointer registers, i.e., lead pointers. Thus, the branch point A is the root branch point and branch points B and C are the current lead pointers (i.e., the row 6015 in FIG. 6A).

Further, as shown in FIG. 6C, based on the lead pointers B and C, the next branch points D and F of the lead pointers B and C, respectively, and the target branch points E and G of the lead pointers B and C, respectively, can be established in the pointer registers, i.e., lead pointers. Thus, the branch point A is the root branch point and branch points D, E, F, and G are the current lead pointers (i.e., the row 6017 in FIG. 6A). At this stage, all lead pointers are filled, without using any branch taken information from the processor core.

As shown in FIG. 6D, the branch taken information from the processor core is received. Assuming the branch of the branch point A is not taken (similar operation can be used if the branch is taken), the processor core executes the next instruction following the branch point A. Thus, the first-reached branch point after the next instruction is branch point B. The root branch point is now moved to branch point B. Further, because the branch point C is not going to be executed, the branch point C and its subsequent branch points F and G are removed from the track table, i.e., pruned.

At the same time, based on the lead pointers D and E of the root branch point B, the next branch points H and J of the lead pointers D and E, respectively, and the target branch points I and K of the lead pointers D and E, respectively, can be established in the pointer registers, i.e., lead pointers. Thus, the branch point B is the root branch point and branch points H, I J, and K are the current lead pointers (i.e., the row 6019 in FIG. 6A). At this stage, all lead pointers are filled, based on the branch taken information from the processor core.

Further, as shown in FIG. 6E, the branch of the branch point B is taken. The processor core executes the branch target instruction of the branch point B. Thus, the first-reached branch point after the branch target instruction is branch point E. The root branch point is now moved to branch point E. Further, because the branch point D is not going to be executed, the branch point D and its subsequent branch points H and I are removed from the track table, i.e., pruned.

At the same time, based on the lead pointers J and K of the root branch point E, the next branch points Q and S of the lead pointers J and K, respectively, and the target branch points R and T of the lead pointers J and K, respectively, can be established in the pointer registers, i.e., lead pointers. Thus, the branch point E is the root branch point and branch points Q, S, R, and T are the current lead pointers (i.e., the row 6021 in FIG. 6A). At this stage, all lead pointers are filled, based on the branch taken information from the processor core.

Thus, the root branch point may correspond to the read pointer in the track table, and the first address (BNX) of the read pointer points to the memory block in the cache or higher level memory. The leads pointers correspond to the pointer registers in the track table system, pointing to the branch points from the next possible pre-fetch instruction segments. The two branch points between the root branch point and the lead pointers (e.g., B and C in FIG. 6C, D and E in FIG. 6D, and J and K in FIG. 6E) correspond to instruction segments being fetched from the lower level memory to the higher level memory, or to instruction segments already pre-fetched in the higher level memory. Although two levels of branch points are used to describe the pre-fetching operation, any number of levels of branch points may be used.

FIG. 7A illustrates another exemplary two-level pre-fetching logic 7000 consistent with the disclosed embodiments. As shown in FIG. 7A, pre-fetching logic 7000 is similar to the pre-fetching logic 5000 in FIG. 5. However, pre-fetching logic 7000 may include a multi-pointer addressing device 5001, which may contain less number of incrementers, selectors, and multiplexers.

Specifically, pre-fetching logic 7000 may include compressed track table 126, tracker 170, and the multi-pointer addressing device 5001. The multi-pointer addressing device 5001 may include incrementer 5003, the pointer registers 5005, 5007, 5009, and 5011, multiplexer 5013, and branch decision logic 5015. The pointer registers 5005, 5007, 5009, and 5011 are used for storing the four second-level branch instructions corresponding to the current instruction being executed.

The multiplexer 5013 is used to select a pointer from the four pointer registers and to address/lookup the track table 126. The incrementer 5003 is used to increase by one the second address (BNY) of the pointer selected from the four pointer registers (i.e., pointer registers 5005, 5007, 5009, and 5011) to reach the next branch point in the same track. If the four pointer registers are not filled completely, the four pointers are filled completely based on the predetermined logic similar to that described above. The branch decision logic 5015 may process or decode the branch taken signal from the processor core to generate simultaneous write-enable signals for the four pointer registers and select signal 5019 for the multiplexer 5013.

Further, when the bus 5021 carries the BN of the target track point read out from the track table 126, the selector 5025 is to select the input from the bus 5021, and the BN is directly stored in the pointer register 5009 or 5011. If the bus 5021 does not carry BN of the target track point read out from the track table 126, the active list may be searched, filled, and the corresponding BN may be outputted to the selector 5025 via bus 5023 and to be stored in the pointer register 5009 or 5011. To simplify the illustration, assuming that the bus 5027 always carries BNs of target track points read from the track table 126 during the lookup/addressing operations. FIG. 6F and FIG. 1 may be referred to illustrate an exemplary logic operation.

For each branch point shown in FIG. 1, the left-side instruction segment may already have a corresponding track in the track table 126, while the right-side instruction segment may need to create a corresponding track in the track table 126. As shown in FIG. 6F, with reference to the track tree in FIG. 1, the four columns 6005, 6007, 6009, and 6011 of the table represent the values of the four pointer registers 5005, 5007, 5009, and 5011, respectively, and the rows represent the contents of the four pointer registers after each update or branch operation.

At the beginning, branch point A is the first branch point after the program is executed. The BN of the branch point A is written into the pointer register 5009. At this point, among the four pointer registers, only the value of the pointer register 5009 is valid, as shown in the row 6023. At this time, the multiplexer 5013 selects the output of the pointer register 5009 as the value of the pointer 5029, and BNY of the pointer 5029 is sent to the incrementer 5003 to be increased by one to move the BNY to the next branch track point following the branch point A (i.e., branch point B). The BN is then updated and stored into the pointer register 5009. At the same time, the value of the pointer 5029 is sent to the track table 126 for look-up/addressing to read out a target track point of the branch point A (i.e., branch point C), and the BN value is updated and written into the pointer register 5009, as shown in row 6025. Thus, the instruction segments 1003 and 1005 corresponding to branch points B and C can be filled into the higher level memory/cache.

Further, the multiplexer 5013 selects the output of the pointer register 5005 as the value of the pointer 5029, and BNY of the pointer 5029 is sent to the incrementer 5003 to be increased by one to move the BNY to the next branch track point following the branch point B (i.e., branch point D). The BN is then updated and stored into the pointer register 5007. At the same time, the value of the pointer 5029 is sent to the track table 126 for look-up/addressing to read out a target track point of the branch point B (i.e., branch point E), and the BN value is updated and written into the pointer register 5011, as shown in row 6027. Thus, the instruction segments 1007 and 1009 corresponding to branch points D and E can be filled into the higher level memory/cache.

Meanwhile, the multiplexer 5013 selects the output of the pointer register 5009 as the value of the pointer 5029, and the BNY of the pointer 5029 is sent to the incrementer 5003 to be increased by one to move the BNY to the next branch track point following the branch point C (i.e., branch point F). The BN is then updated and stored into the pointer register 5007. At the same time, the value of the pointer 5029 is sent to the track table 126 for look-up/addressing to read out a target track point of the branch point C (i.e., branch point G), and the BN value is updated and written into the pointer register 5009, as shown in row 6027. Thus, the instruction segments 1011 and 1013 corresponding to branch points F and G can be filled into the higher level memory/cache. The above operations may be performed without the taken control signal from the processor core.

It should be noted that, for a branch point (e.g., branch point B), the BNs of the two next level branch points (e.g., branch points D and E) of the branch point are written to corresponding pointer registers simultaneously. The order to write BNs corresponding to branch points at the level (e.g., branch points B and C) are not fixed. For example, the two next-level branch points D and E of the branch point B may be written to the corresponding pointer registers first and, then, the two next-level branch points F and G of the branch point C are written to the corresponding pointer registers. Or the two next-level branch points F and G of the branch point C are written to the corresponding pointer registers first and, then, the two next-level branch points D and E of the branch point B may be written to the corresponding pointer registers. Any appropriate writing order may be used.

After the above updating, the instructions corresponding to two branch levels from the branch point A are pre-fetched. The multi-pointer addressing device 5001 stops updating and waits for the branch taken information 5031 from the processor core.

The first branch point A is then executed by the processor core and the branch taken information 5031 is sent to the multi-pointer addressing device 5001. If the information 5031 shows branch is taken, the next branch point to be executed is updated to the branch point C and the four pointer registers are updated to the branch points L, M, N, and P, and corresponding instruction segments are pre-fetched.

On the other hand, if the branch taken information 5031 shows that the branch is not taken, the next branch point to be executed is updated to the branch point B and the four pointer registers are updated to the branch points H, I, J, and K, and corresponding instruction segments are pre-fetched.

More particularly, using not-taken as an example, i.e., when the branch of the branch point A is not taken, the branch decision logic 5015 generates a control signal, such that the multiplexer or selector 5013 selects the output of the pointer register 5007 as the value of the pointer 5029, and BNY of the pointer 5029 is sent to the incrementer 5003 to be increased by one to move the BNY to the next branch track point following the branch point D (i.e., branch point H). The BN is then updated and stored into the pointer register 5005. Further, the multi-way selector 5013 selects the output of the pointer register 5007 as the value of the pointer 5029 to address the track table 126 to read out a target track point of the branch point D (i.e., branch point I), and the BN value is updated and written into the pointer register 5009, as shown in row 6029. Thus, the instruction segments 1015 and 1017 corresponding to branch points H and I can be filled into the higher level memory/cache.

Further, the branch decision logic 5015 again generates a control signal to enable multiplexer or selector 5013 to select the output of the pointer register 5011 as the value of the pointer 5029, and BNY of the pointer 5029 is sent to the incrementer 5003 to be increased by one to move the BNY to the next branch track point following the branch point E (i.e., branch point J). The BN is then updated and stored into the pointer register 5007. Further, the multiplexer or selector 5013 selects the output of the pointer register 5011 as the value of the pointer 5029 to address the track table 126 to read out a target track point of the branch point E (i.e., branch point K), and the BN value is updated and written into the pointer register 5011, as shown in row 6029. Thus, the instruction segments 1019 and 1021 corresponding to branch points J and K can be filled into the higher level memory/cache. Thus, pre-fetching for two levels of the branch points is completed, and the multi-pointer addressing device 5001 again stops updating and waits for the branch taken information 5031 from the processor core.

When pre-fetching instructions of the two levels of the branch points, two instruction segments may be pre-fetched at the first level and four instruction segments may be pre-fetched at the second level. Thus, a total of six instruction segments may be pre-fetched. For example, in FIG. 1, if branch point A is the first branch point following the instruction currently being executed, i.e., the branch point A is the root branch point, and after the two-level pre-fetching operation, instruction segments 1003, 1005, 1007, 1009, 1011, and 1013 may be filled in the cache. However, not all of these instruction segments may be executed, which may cause so-called data pollution in the cache. Thus, a prune operation may be implemented to reduce the data pollution. FIG. 7B illustrates another exemplary two-level pre-fetching logic 7500 with prune operation functionality.

As shown in FIG. 7B, the pre-fetching logic 7500, similar to pre-fetching logic 7000 in FIG. 7A, includes track table 126, tracker 170, and multi-pointer addressing device 5001. Further, pre-fetching logic 7500 also includes a trace register 7509, a selector 7507, a bus 7501, a bus 7511, and a temporary storage unit 7503.

As previously described, the pointer registers 5005, 5007, 5009, and 5011 store the four lead pointer values corresponding to the current root branch point. Assuming the branching point A is the root branch point, as shown by row 6023 in FIG. 6F, the instruction segment 1003 is filled in the cache and a track is created in the track table 126.

Further, if the instruction segment 1005 corresponding to the branch target instruction is not yet stored in the cache, the instruction segment 1005 is also pre-fetched. However, the pre-fetched instruction segment 1005 is not stored in the cache, but stored in the temporary storage unit 7503 through the bus 7501. Similarly, when fetching the instruction segment 1005, the instructions are scanned and new track(s) and track points may be created in the temporary storage unit 7503, instead of the track table 126. Thus, the next-level branch points B and C can be established based on the root branch point A, as shown by row 6025 in FIG. 6F, and stored in the pointer registers 5005 and 5009, respectively. Because the instruction segment 1007 has already been stored in the cache and the instruction section 1011 has already been stored in the temporary storage unit 7503 (e.g., during the fetch/scan operation), so the instruction segments 1009 and 1013 (not yet stored in the cache) are pre-fetched into the temporary storage unit 7503 via a bus 7501. Thus, the next-level branch points D, E, F, and G can be established. As shown by row 6027 in FIG. 6F, the pointer registers 5005, 5007, 5009, and 5011 respectively store information of the branch points F, D, G, and E. The two-level pre-fetching for the root branch point A is then completed, and values from the pointer registers 5009 and 5011 (corresponding to the branch points G and E) are sent to the selector 7507 for selection.

If the branch of the root branch point A is not taken, the root branch point move to branch point B and the lead registers are updated. Because the instruction segments or segments 1003, 1007, and 1015 are already stored in the cache, and instruction segments 1009 and 1019 are stored in the temporary storage unit 7503, after updating the leading pointers, only the instruction segments 1017 and 1021 need to pre-fetched and stored in the temporary storage unit 7503. At the same time, the previously instruction segments 1005, 1011, and 1013 stored in the temporary storage unit 7503 can be discarded. Meanwhile, the selector 7507, under the taken control signal 5031, selects the value of the pointer register 5011 (branch point E) as the output, which is stored in the trace register 7509.

Afterwards, if the branch of the root branch point B is not taken, the above steps may be repeated. If the branch of the root branch point B is taken, the instruction segment and track point information corresponding to the value of the trace register 7509 (branch E) are sent to the cache and track table 126 via bus 7511, respectively, such that the instruction segment 1009 and its following instruction segment 1019 are filled in the cache before execution by the processor core.

On the other hand, if the branch of the root branch point A is taken, the root branch point move to branch point C and the lead registers are updated. The instruction segment 1005 and its following instruction segment 1011 are stored in the cache, and their corresponding track points are stored in the track table 126. In this case, only the instruction segments 1025 and 1029 need to pre-fetched and stored in the temporary storage unit 7503. At the same time, the previously instruction segment 1009 stored in the temporary storage unit 7503 can be discarded. Thus process may be repeated by any number of times during operation.

Thus, by the above approach all possible instruction segments can be pre-fetched and their corresponding track points can be created, but only those instruction segments will be executed are stored in the cache and their corresponding track points are stored in the track table. The data pollution in the cache can be avoided.

In addition, because the tracker keeps information about the root branch point, when the branch information is generated from the executed branch instruction, the tracker can start from the root branch point and update the pointer registers in the multi-pointer addressing device. The instruction segment that will be executed can be determined and the instruction segment and its track point information stored in the temporary storage unit can be stored in the cache and the track table, respectively. The data pollution may be avoided without using the trace register.

In certain embodiments, the track table structure may be used to pre-fetch and fill lower level memory, such as a level 2 cache. The level two cache system may include a separate set of fill/generator, active list, track table, tracker, and branch decision logics and receive from the processor core certain information on the instruction currently being executed, such as whether the currently-executed instruction is a branch instruction, whether the branch is taken or not, etc. The level-two cache can be filled based on the track table and may provide instructions to the level-one cache when the level-one cache does not contain these instructions. FIG. 8 illustrates an exemplary two-level track table cache structure 8000.

As shown in FIG. 8, cache structure 8000 includes a level-one track table system 8101 and a level-two track table system 8111. The level-one track table system 8101 may be similar to cache structure 3000 in FIG. 3. The level-two track table system 8111 may be similar to level-one track table system 8101. However, the level-two track table system 8111 does not include a processor core, and has the level-two cache 8133 instead of level-one cache 8135.

The level-one track table system 8101 is used to pre-fetch instruction segments possibly to be executed by the processor core 125 into the level-one cache 8135, so as to ensure that, when the processor core 125 fetches for an instruction, the instruction has been filled into the level-one cache 8135 already to avoid a level-one cache miss. On the other hand, the level-two track table system 8111 is used to pre-fetch those instruction segments that may be executed by the processor core 125 but not yet in the level-one cache 8135 (i.e., the level-one cache 8135 may pre-fetch instruction segments from the level-two cache 8133) into the level-two cache 8133 from an external memory, so as to ensure that, when the level-one cache 8135 pre-fetches an instruction segment, the instruction segment is already stored in the level-two cache 8133 to avoid a level-two cache miss. The external memory coupled to the level-two track table system 8101 may be a level-three memory 8233, an external storage medium, a network storage medium, or any appropriate type memory device. The external memory may also have a larger capacity than the level-one or level-two cache.

In the cache structure 8000, for the level-one track table system 8011, the level-one track table read pointer 55 points to the first branch instruction following the non-branch instruction being executed by the processor core, and the level-one track table read pointer 55 address the level-one track table 126 to read out the track point content 8014, which is the position of the branch target track point in the level-one track table. The details of the operations of the level-one track table 126 are described previously and are omitted here.

Similarly, for the level-two track table system 8111, read pointer 8123 is used for addressing the level-two track table 8113, and the selector 8121 and the increasing-by-one logic or incrementer 8131 are similar to the selector 49 and increasing-by-one logic 48 in the level-one track table system 8101 and are used to increase by one the second address (BNY) to move the read pointer 8123 to the first-reached branch instruction following the current instruction in the level-two track table 8113 and the track point information is read out. If the track point includes the BN value of the level-two track table 8113, it may indicate that the branch target instruction segment is stored in the level-two cache and there is no need to pre-fetch.

On the other hand, if the track point information is not the BN, the level-two active list needs to be matched and updated, and the pre-fetch, scan, and fill operations are then performed to fill the corresponding instruction segment in the level-two cache. Similarly, the branch taken information 8109 from the processor core 125 is used to control the update to register 8119 to ensure the tracker in the level-two track table system 8111 can have the correct value and update the read pointer 8123. That is, when the read pointer 55 of the level-one track table 126 changes and points to a new track point in the track table, the read pointer 8113 of the level-two track table system 8111 also changes under control of the branch taken signal and points to a corresponding new track point in the level-two track table 8113. Further operations, such as active list matching and fill operation, can also be performed to pre-fetch instructions in the level-two track table system. When the level-one cache needs to be filled, the first address (BNX) of the level-two read pointer points to the instruction segment needs to be filled in the level-one cache.

To eliminate or to cover the level-one cache miss due to the level-two cache misses, the level-two track table system can pre-fetch more levels of branch target instruction segments, such that the instruction segments needed by the level-one cache can be filled in the level-two cache well in advance. That is, based on the response time for the lower level memory to fetch instructions, the number of levels of branch target instruction segments can be determined.

For example, if the level-one track table system only pre-fetches one level of branch target instruction, the level-two track table system may pre-fetch two or more levels of branch target instructions, and so on. In other words, once the read pointer of the level-one track table system changes and points to a new track point in the level-one track table, based on methods in FIG. 5, the pointer registers of the level-two track table system also are changed accordingly and updated to corresponding new branch points in the level-two track table. Further operations, such as active list matching and fill operation, can also be performed to pre-fetch various levels of branch target instructions in the level-two track table system.

In general, the level-two cache has a larger capacity than the level-one cache. The number of tracks in the level-two track table can also be greater than the number of tracks in the level-one track table, and the number of track points in a track from the level-two track table can also be greater than the number of track points in a track from the level-one track table, even with the track table compression mechanism in FIG. 4.

In certain embodiments, the level-two track table may be further compressed to save space and/or to increase speed and efficiency. FIG. 9 illustrates an exemplary compressed track table structure 9000.

As shown in FIG. 9, an instruction segment 8001 in the level-two cache may be twice as large as an instruction segment in the level-one cache and, thus, the number of instructions contained in the instruction segment 8001 is twice of the number of instructions in the level-one instruction segment. The dotted line shows a boundary separating the instruction segment 8001 into two level-one instruction segments.

Further, branch instructions are identified in the instruction segment 8001, the instruction marked with 'O' is a branch instruction whose branch target is within the instruction segment 8001 itself, i.e., an inside branch instruction, and the instruction marked with 'X' is a branch instruction whose branch target is outside the instruction segment 8001, i.e., an outside branch instruction. Whether a branch instruction is an inside branch instruction or outside branch instruction can be determined based on the location or address of the branch instruction and the branch target offset. That is, whether a source branch instruction (branch point) is an outside branch instruction or an inside branch instruction can be determined by whether the branch target track point is within the same track as the source branch point.

For example, if the offset of the branch instruction within the instruction segment is added with the branch target offset, and the result is greater than or equal to '0' and less than the number of instructions in the instruction segment, the branch instruction can be determined as an inside branch instruction. Otherwise, the branch instruction is an outside branch instruction. The branch point corresponding to an inside branch instruction is called an inside branch point, and the branch point corresponding to an outside branch instruction is called an outside branch point.

In a level-two track (a track in the level-two track table), only information of branch instructions marked with 'X' is stored, while the information of branch instructions marked with 'O' is not stored. In other words, only outside branch points are stored in the level-two track, and inside branch points are skipped to further reduce the length of the level-two track.

As shown in FIG. 9, in the instruction segment 8001, the first branch point 8011 is an inside branch instruction, marked with 'O'; the second branch point 8013 is an outside branch instruction, marked with 'X'; and the third branch point 8015 is an inside branch instruction, marked with 'O', and so on.

Assuming that the first half of the level-two instruction segment 8001 before dotted line (i.e., level-one cache instruction segment 8007) has been stored in the level-one cache and corresponds to the level-one track such as track 8005, where the track points marked with 'X' and 'O' are with the same number and with the same relationship as in the instruction segment 8001. The level-one track can also be compressed using methods in FIG. 4 in compressed level-one track 8009, i.e., every entry in the level-one track 8005 represents a branch instruction, and only branch points (both 'X' type and 'O' type) are stored in the level-one track 8009. Because the level-one track includes all branch points in the level-one cache instruction segment 8007, the level-one pre-fetching can be performed.

Different from the level-one track 8009, the level-two track 8003 only stores 'X' type branch points. Further, because the level-two track table does not contain insider branch points, and an insider branch point may have a branch target cross over an outsider branch point, the level-track table may be used to assist moving the read pointer for insider branch points. Specifically, to correctly move the read pointer, the level-two track table may need information for moving the pointer (with a PC or a level-one BN) and flag information on whether the currently executed instruction by the processor core is an insider branch instruction or an outside branch instruction.

FIG. 10A illustrates an exemplary two-level compressed track table based cache system 10000. As shown in FIG. 10A, the lower part (i.e., level-one track table system 9001) may have same functionality as FIG. 3, and the level-one track table 126 may be compressed according to FIG. 4, and each entry (branch point) in a level-one track may include the instruction type 57, the first address (BNX) 58, the second address (BNY) 59, and an extra flag bit 9033. A '1' in the flag bit may indicate an 'X' type branch point (i.e., an outside branch instruction), and a '0' in the flag bit may indicate an 'O' type branch point (i.e., an inside branch instruction).

When read pointer 55 addresses the level-one track table 126 to read out track point information, the flag 9033 is also read out and sent to the level-two track table 9011 (upper half of the system 10000) via bus 9003 to control the selector 9017. The information from the processor core on whether the currently executed instruction is a branch instruction and whether the branch is taken is not only used to control the corresponding registers and selectors in the level-one track table system 9001, but also sent to the level-two track table system 9011 through the bus 9007 and the bus 9009, respectively, to control register 9019 and selector 9021. After receiving the information, the level-two track table system 9011 can perform level-two cache instruction pre-fetching.

If the instruction currently being executed by the processor core is not a branch instruction, read pointer 55 of the level-one track table points to the first branch instruction following the currently executed instruction. This branch instruction may be an 'X' type branch point or 'O' type branch point. However, the level-two track contains only 'X' type branch instruction information. Thus, the read pointer of the level-two track table 9023 points to the first 'X' type branch instruction following the currently executed instruction by the processor core. That is, the track point content 9004 (including flag bit information 9003) read out by the level-one read pointer 55 from level-one track table 126 is the branch target track point information of the first branch instruction following the currently executed instruction; while the track point content 9025 read out by the level-two read pointer 9023 from level-two track table 9013 is the branch target track point information of the first 'X' type branch point.

If the first branch instruction following the currently executed instruction is an 'O' type branch point, i.e., the branch point and its branch target instruction are with the same level-two instruction segment, the flag bit sent to the selector 9017 for controlling the selection is set to '0', the selector 9017 selects level-two track offset 9027 outputted from a mapping module 9015. The mapping module 9015 receives the branch target offset 9005 from the processor core, and converts the branch target offset 9005 to level-two track offset 9027.

For example, when high bits of the address of the instruction (branch target address) are used as the block address for the level-two cache memory block, the low bits of the instruction address (branch target offset 9005) can be used to address each instruction in the level-two cache memory block. Using methods in FIG. 4, the branch target offset 9005 can be converted to the level-two track offset 9027 of the first 'X' type branch point following the corresponding branch target track point in the corresponding level-two track table.

At this point, the updated level-one read pointer 55 points to the first branch instruction following the branch target instruction; while the level-two read pointer 9023 points to the first 'X' type branch point following the branch target instruction. Because the branch target instruction and the branch instruction are with the same level-two memory block, the level-two track table system 9011 does not need perform pre-fetching operation.

If the first branch instruction following the currently executed instruction is an 'X' type branch point, i.e., the branch point and its branch target instruction are in different level-two memory blocks, the flag bit sent to the selector 9017 for controlling the selection is set to '1', the selector 9017 selects level-two track table BN value 9029 outputted from selector 9021. Selector 9021 and increasing-by-one logic 9031 are similar to selector 49 and increasing-by-one logic 48 in the level-one track table system 9001 and are used to increase the second address (BNY) by one such that the read pointer 9023 is moved towards to the next branch point in the current level-two track, or to select the track point contents read out from the level-two track table to move the read pointer 9023 pointing to a target track point of an 'X' type branch point. Corresponding level-two active list (not shown) matching, updating, and instruction pre-fetching may also be performed to fill the corresponding instruction segment in the level-two cache. Similarly, the information 9007 sent from the processor core on whether the currently executed instruction is a branch instruction can be used to control the updating of register 9019, such that the level-two track table system 9011 can perform various instruction pre-fetching based on the track table.

When the level-one track table system determines to pre-fetch instructions, a request for obtaining an instruction segment is sent to the level-two track table system. If the instruction segment is a branch target instruction segment of an 'X' type branch point, as previously described, the level-two track table system has already fetched the branch target instruction segment into the level-two cache and a BN value of a corresponding level-two track has been assigned. Thus, the first address (BNX) of the branch target track point of the track point pointed by the read pointer 9023 (i.e., the 'X' type branch point) can be read out from the level-two track table 9013. The first address can then be used to find the corresponding memory block in the level-two cache. Because the size of the level-two cache memory block is larger than the size of the level-one cache memory block, when addressing the level-two cache memory block, the mapping module 9015 maps the offset 9005 sent by the processor core, the instruction segment requested by the level-one track table system can then be selected from the level-two cache memory block and the instruction segment is sent to the level-one track table system for fill operations.

For example, if the size of the level-two cache memory block is twice the size of the level-one cache memory block, the instruction address offset for addressing the level-two cache memory block has one more bit than the instruction address offset for addressing the level-one cache memory block. This extra bit can be used to determine whether the instruction segment requested by the level-one track table system is in the high-half or the low-half of the level-two cache memory block. For example: when this bit is '0', the instruction segment requested by the level-one track table system is in the low-half of the level-two cache memory block; when this bit is '1', the instruction segment requested by the level-one track table system is in the high-half of the level-two cache memory block.

When the level-one track table system sends a request for obtaining an instruction segment to the level-two track table system, if the instruction segment is a branch target instruction segment of an 'O' type branch point, as previously described, the 'O' type branch point and the branch target instruction segment are within the same level-two cache memory block. The first address (BNX) from of the read pointer 9023 is kept unchanged, and the mapping module 9015 maps the offset 9005 sent by the processor core to select the instruction segment requested by the level-one track table system from the level-two cache memory block. The selected instruction segment is then sent to the level-one track table system for fill operations.

Thus, the level-two track table system 9011 divides the branch points into an 'X' type and an 'O' type, and stores only the 'X' type branch points. The size of the level-two track table can be significantly reduced. In addition, because the target instruction corresponding to the 'O' type branch point has been stored in the level-two cache, and only the target instruction corresponding to 'X' type branch point may not have been stored in the level-two cache, the read pointer 9023 of the level-two track table can jump over the 'O' type branch points and can move to the next 'X' type branch point more quickly. The instructions can be pre-fetched much more in advance and the response time for accessing an external memory can be eliminated or covered.

It should be noted that, although the above example uses two levels of cache systems based on track table structures, more levels of cache systems may be used using similar structures.

Further, the compression mechanism for the level-two track table may also be used to compress the level-one track table. For example, the branch points in a level-one track can be divided into an 'X' type and an 'O' type, and the level-one track table is addressed by two trackers. The read pointer of one tracker only points to the 'X' type branch points, while the read pointer of the other tracker points to all branch points (i.e., the 'X' type and 'O' type branch points). The read pointers of both trackers are updated based on the execution of the branch points. FIG. 10B illustrates an exemplary level-one cache system 10500.

As shown in FIG. 10B, cache system 10500 include various similar components/structures as previous described. However, cache system 10500 also includes a compressed level-one track table 10505, a first tracker 10501, and a second tracker 10503.

The second tracker 10503 is similar to the level-one tracker logic in FIG. 10A. Based on the branch execution information 9009 sent from the processor core 125, the read pointer 55 is updated and the current branch point type (flag bit 9033) is sent to the first tracker 10501 via bus 9003.

The first tracker 10501 is similar to the level-two tracker logic in FIG. 10A. The read pointer 9023 is used to address the track table 10505 to read out the track point contents of the 'X' type branch point and send to the selector 9021 via bus 9025. At the same time, the increasing-by-one logic 9031 increase the read pointer 9023 by one to point to the first 'X' type branch point following the current 'X' type branch point and to send the increased value to the selector 9021. Based on the branch execution information 9009, the selector 9021 can make selection accordingly, as previously described.

If the flag bit 9033 sent from the second tracker 10503 indicates that the current branch point is an outside branch point, the read pointer of the first tracker 10501 is updated to point to the branch target track point of the 'X' type branch point (or the first 'X' type branch point following the branch target track point). Specifically, as previously described, if the branch target track point of the 'X' type branch point is not an 'X' type branch point, the selector 9017 selects location information of the first 'X' type branch point following the branch target track point converted by the mapping module 9015 based on the offset 9005 sent by the processor core 125, such that the read pointer 9023 is updated to point to the 'X' type branch point.

Thus, the first tracker 10501 always points to 'X' type branch points, while the second tracker 10503 can point to both types of branch points. The read pointers of the trackers can be correctly updated and move fast to pre-fetch instructions. The response time for fetching instructions from lower level memory can be eliminated or masked.

FIG. 11 illustrates an exemplary multi-core cache system 11000 based on the track table structures. As shown in FIG. 11, multi-core cache system 11000 includes level-one track table systems 11001 and 11003, representing a first processor core with its track table system and a second processor core with its track table system, respectively. The multi-core cache system 11000 also include a level-two track table system 11005. For simplicity, assuming the level-two track table system 11005 is not compressed, or is compressed similarly to the level-one track table systems.

Within the level-two track table system 11005, the pointer register 11007, selector 11009, and increasing-by-one logic 11011 work with the level-one track table system and may have similar functionalities to the register 9019, the selector 9021, and the increasing-by-one logic 9031 in FIG. 10A, forming the corresponding level-two tracker corresponding to the level-one track table system 11001 and achieving the interaction between the level-one track table system 11001 and the level-two track table system 11005. Further, the pointer register 11013, selector 11015, and increasing-by-one logic 11017 work with the level-one track table system 11003 and may have similar functionalities to the register 9019, the selector 9021, and the increasing-by-one logic 9031 in FIG. 10A, forming the corresponding level-two tracker corresponding to the level-one track table system 11003 and achieving the interaction between the level-one track table system 11003 and the level-two track table system 11005.

Further, the level-two track table system 11005 may be shared by the two level-one track table systems 11001 and 11003 to provide instructions to be pre-fetched. If the read pointer of any of the level-one track table systems 11001 and 11003 changes, the pointer registers in the level-two track table system 11005 may also change and be updated to new branch points in the level-two track table. Other operations, such as active list matching and fill operation, may also be performed accordingly. If both read pointers of the level-one track table systems 11001 and 11003 change, an arbitration logic 11019 may be used to determine an order to update the pointer registers of the level-two track table system 11005 and to pre-fetch instructions.

Specifically, if only one of the processor cores is currently executing a branch instruction, assuming the executing processor core is from the level-one track table system 11001 (similar to the level-one track table system 11003), the read pointer of the level-one track table system 11001 points to the next branch point based on whether the branch is taken for the current branch instruction. That is, the read pointer points to a first branch point following the next instruction in sequence or a first branch following the branch target instruction.

At this time, the 'BRANCH0' signal 11023 sent to the arbitration logic 11019 from the level-one track table system 11001 is valid, while the 'BRANCH1' signal 11025 sent to the arbitration logic 11019 from the level-one track table system is invalid, indicating only the read pointer of the level-one track table system 11001 is updated. Thus, the arbitration logic 11019 controls selector 11021 to select the output of the pointer register 11007 as the BN value of the read pointer 11027 of the level-two track table system 11005. Similar to FIG. 8, the increasing-by-one logic 11011 calculates the BN value of the first branch point following the branch point pointed by the read pointer 11027, and the track point contents of the branch point are read out from the level-two track table using the BN value. The selector 11009 then makes the selection according to the branch execution information ('TAKEN0') 11033, writes back to the pointer register 11007, and completes the update of the pointer register 11007. In this process, the branch target instruction address pointed by the updated pointer register 11007 is sent to the level-two active list 11035 for address matching, obtaining the BN value, generating a new BN value, and/or instruction segment pre-fetching operations, as described previously.

If both processor cores are currently executing branch instructions, both of the 'BRANCH0' signal 11023 sent to the arbitration logic 11019 from the level-one track table system 11001 and the 'BRANCH1' signal 11025 sent to the arbitration logic 11019 from the level-one track table system are valid. The arbitration logic 11019 may determine which level-one track table system to be processed first.

For example, the arbitration logic 11019 may use a fixed priority (e.g., the level-one track table system 11001 always has priority), and may enable the processing for the level-one track table system 11001 whenever both track table systems send valid signals. Or the priority may be dynamic, the arbitration logic 11019 may determine a priority in real-time to process signals from the level-one track system based on the current priority.

FIG. 12 illustrates another level-two track table compression structure 12000. As shown in FIG. 12, track table compression structure 1200 is similar to FIG. 1, the left-side path of a branch point represents a next instruction following the branch instruction when the branch is not taken, and the right-side path of the branch point represents the branch target instruction of the branch instruction when the branch is taken. However, track table compression structure 1200 also marks each branch point with a branch type, a branch point marked with 'X' is an outside branch point and a branch point marked with 'O' is an inside branch point.

For example, assuming that the branch point A (12001) is the first branch point following the instruction currently executed by the processor core, and if only one level of branch points is pre-fetched. The read pointer of the level-two track table system points to the branching point A (12001) to ensure that both the next instruction segment and the branch target instruction segment are filled in the level-two cache. Afterwards, if the branch of the branch point A (12001) is not taken, the read pointer points to the next outside branch point, i.e., the branch point D. If the branch of the branch point A (12001) is taken, the read pointer points to the next outside branch point following the branch target instruction of the branch point A (12001), i.e., the branch point C.

If the two levels of branch points are pre-fetched, without dividing the branch points into inside branch points and outside branch points, the four pointer registers in the level-two track table system respectively store the location information of branch points D, E, F, and G in the level-two track table. However, after dividing the branch points into inside branch points and outside branch points and keeping only the outside branch points in the level-two track table, the four pointer registers in the level-two track table system respectively store the location information of the branch points D, J, F, and N, having more number of levels. Thus, the compression based on branch type may reach branch target instructions more quickly and at more depth, and the response time for fetching instructions from lower level memory can be eliminated or masked.

By using the disclosed methods and systems, advantageous cache applications may be implemented. Different from the current fill-after-miss cache structures, the disclosed methods and systems using track table to pre-fetch branch target instruction segments without referring execution history, an instruction segment can be filled into a higher level memory from lower level memory before the processor core starts to execute instructions in the instruction segment. Thus, with this integrated pre-fetching mechanism, the process of traditional cache tag matching can be avoided.

Further, multiple levels of branch target instruction segments can be pre-fetched, such that the instructions can be fetched well in advance of the execution. The response time for fetching instructions from lower level memory can be eliminated or masked.

In addition, the track table can be compressed in various ways to reduce the size of the track table. The lead pointer can move more quickly and the pre-fetch time of the instruction segments is further reduced. Further, a pruning method may be used to reduce the data and number of write operation to the cache, and instruction cache data pollution may then be avoided.

Moreover, the disclosed track table system can perform instruction search simultaneously with respect to multi-level cache structure, and may also be applied in multi-core systems. Other applications, advantages, alternations, modifications, or equivalents to the disclosed embodiments are obvious to those skilled in the art.

INDUSTRIAL APPLICABILITY

The disclosed systems and methods may be used in various applications in memory devices, processors, processor subsystems, and other computing systems. For example, the disclosed systems and methods may be used to provide low cache-miss rate processor applications, and high-efficient data processing applications crossing multiple levels of caches or even crossing multiple levels of networked computing systems.

The invention claimed is:

1. A method for assisting operations of a processor core, the processor core being coupled to a first memory and a second memory with a faster speed than the first memory, the method comprising:
examining instructions being filled from the first memory to the second memory to extract instruction information containing at least branch information of the instructions;
creating a plurality of tracks based on the extracted instruction information; and
filling one or more instructions from the first memory to the second memory based on one or more tracks from the plurality of tracks before the processor core starts executing the one or more instructions, such that the processor core fetches the one or more instructions from the second memory for execution,
wherein filling the one or more instructions further includes: pre-fetching from the first memory to the second memory instruction segments containing the one or more instructions corresponding to at least two levels of branch target instructions based on the one or more tracks.

2. The method according to claim 1, wherein creating the plurality of tracks further includes:
storing track point contents of only branch instructions in corresponding entries in the plurality of tracks.

3. The method according to claim 2, wherein:
each entry corresponds to a branch instruction.

4. The method according to claim 1, further including:
storing location information of last level branch target points of the at least two levels of branch target instructions.

5. The method according to claim 4, further including:
updating the location information of last level branch target points based on execution condition of a root branch point by the processor core.

6. The method according to claim 4, further including:
storing instruction segments corresponding to the at least two levels of branch target points in a temporary storage unit that is different from the second memory.

7. The method according to claim 6, further including:
determining that an instruction segment is to be executed by the processor core based on the execution condition of the root branch point; and
storing the instruction segment into the second memory from the temporary storage unit.

8. A method for assisting operations of a processor core, the processor core being coupled to a first memory and a second memory with a faster speed than the first memory and the first memory being coupled to a third memory with a slower speed than the first memory, the method comprising:

examining instructions being filled from the first memory to the second memory to extract instruction information containing at least branch information of the instructions;

creating a plurality of level-one tracks based on the extracted instruction information;

filling one or more instructions from the first memory to the second memory based on one or more level-one tracks from the plurality of level-one tracks before the processor core starts executing the one or more instructions, such that the processor core fetches the one or more instructions from the second memory for execution;

examining instructions being filled from the third memory to the first memory to extract instruction information containing at least branch information of the instructions;

creating a plurality of level-two tracks based on the extracted instruction information; and filling the one or more instructions from the third memory to the first memory based on one or more level-two tracks from the plurality of level-two tracks before the processor core starts executing the one or more instructions, such that the first memory fills the one or more instructions into the second memory before the second memory requests the one or more instructions from the first memory.

9. The method according to claim 8, further including:
determining whether the first memory contains an instruction segment corresponding to a branch target instruction of a branch instruction; and when the first memory does not contain the instruction segment corresponding to the branch target instruction of the branch instruction, filling the instruction segment into the first memory such that the first memory contains the branch target instruction before the processor core executes the branch instruction.

10. The method according to claim 8, further including:
determining whether the first memory contains an instruction segment corresponding to a branch target instruction of a branch instruction; and when the first memory does not contain the instruction segment corresponding to the branch target instruction of the branch instruction, filling instruction segments corresponding to at least two levels of branch target instructions based on the one or more level-two tracks, including the instruction segment corresponding to the branch target instruction of the branch instruction, into the first memory such that the first memory contains the branch target instruction and other branch target instructions before the processor core executes the branch instruction.

11. The method according to claim 8, wherein creating the plurality of level-two tracks further includes:
creating a level-two track table; and
creating the plurality of level-two tracks corresponding to a plurality rows in the level-two track table, each row including a plurality of entries and each entry corresponding to a track point which representing at least one instruction.

12. The method according to claim 11, further including:
providing a first address and a second address for the level-two track table based on the level-two track table and an address incrementer;

determining whether a current track point is a branch instruction;

when the current track point is not a branch instruction, keeping the first address unchanged as a next first address; increasing the second address by the address incrementer to obtain a next second address; and moving to a next track point based on the next first address and the next second address;

when the current track point is a branch instruction, determining whether a branch of the current track point is taken based on a control signal from the processor core;

when the branch of the current track point is taken, reading out contents of the current track point to derive the next first address and the next second address to move to the next track point; and when the branch of the current track point is not taken, keeping the first address unchanged as the next first address, increasing the second address by the address incrementer to obtain the next second address;

and moving to a next track point based on the next first address and the next second address.

13. The method according to claim 11, wherein:
each entry in a level-two track corresponds to a branch instruction.

14. The method according to claim 11, wherein examining the instructions being filled from the third memory to the first memory further includes:
determining a branch target of a branch instruction in an instruction segment;

when the branch target is outside a range of the instruction segment, determining that the branch instruction is an inside branch instruction; and when the branch target is within the range of the instruction segment, determining that the branch instruction is an outside branch instruction.

15. The method according to claim 14, wherein:
each entry in a level-two track corresponds to an outside branch instruction.

16. A method for assisting operations of multiple processor cores in a multi-core system including a first track table system having a processor core coupled to a first memory and a second memory in the first track table system, a second track table system having a processor core coupled to a first memory and a second memory in the second track table system, and a third memory coupled to both the first memory in the first track table system and the first memory in the second track table, the method comprising:

examining, by each of the first track table system and the second track table system, instructions being filled from the first memory to the second memory to extract instruction information containing at least branch information of the instructions;

creating, by each of the first track table system and the second track table system, a plurality of level-one tracks based on the extracted instruction information;

filling, by each of the first track table system and the second track table system, one or more instructions from the first memory to the second memory based on one or more level-one tracks from the plurality of level-one tracks before the processor core starts executing the one or more instructions, such that the processor core fetches the one or more instructions from the second memory for execution;

examining instructions being filled from the third memory to the first memory to extract instruction information containing at least branch information of the instructions;

creating a plurality of level-two tracks based on the extracted instruction information; and filling the corresponding one or more instructions from the third memory to the first memory based on one or more level-two tracks from the plurality of level-two tracks before the processor core of either the first track table system or the second track table system starts executing the corresponding one or more instructions, such that the first memory of either the first track table system or the second track table system fills the corresponding one or more instructions into the second memory of either the first track table system or the second track table system.

17. The method according to claim 16, wherein:

the processor core determines a next branch point following a current branch point based on whether a branch of the current branch point is taken.

18. The method according to claim 16, further including:

determining, by each of the first track table system and the second track table system, whether the first memory contains an instruction segment corresponding to a branch target instruction of a branch instruction; and when the first memory does not contain the instruction segment corresponding to the branch target instruction of the branch instruction, filling, by each of the first track table system and the second track table system, the instruction segment into the first memory from the third memory such that the first memory contains the branch target instruction before the processor core executes the branch instruction.

19. The method according to claim 18, further including:

when both the processor core of the first track table system and the processor core of the second track table system are executing the branch instruction, determining, by an arbitration unit, one of the first track table system and the second track table system is processed first; and filling the instruction segment into the corresponding first memory from the third memory such that the corresponding first memory contains the branch target instruction before the corresponding processor core executes the branch instruction.

* * * * *